US007081621B1

(12) United States Patent
Willoughby et al.

(10) Patent No.: US 7,081,621 B1
(45) Date of Patent: Jul. 25, 2006

(54) LAMINATED LENS FOR FOCUSING IONS FROM ATMOSPHERIC PRESSURE

(76) Inventors: Ross Clark Willoughby, Chem-Space Associates, Inc., 655 William Pitt Way, Pittsburgh, PA (US) 15238; Edward William Sheehan, Chem-Space Associates, Inc., 655 William Pitt Way, Pittsburgh, PA (US) 15238

( * ) Notice: Subject to any disclaimer, the term of this patent is extended or adjusted under 35 U.S.C. 154(b) by 0 days.

(21) Appl. No.: 10/989,821

(22) Filed: Nov. 15, 2004

(51) Int. Cl.
*B01D 59/44* (2006.01)

(52) U.S. Cl. ...................... 250/288; 250/283; 250/294; 250/398; 250/306; 250/307

(58) Field of Classification Search ..................... None
See application file for complete search history.

(56) References Cited

U.S. PATENT DOCUMENTS 4,209,696 A 6/1980 Fite
4,531,056 A 7/1985 Labowsky et al.
4,542,293 A 9/1985 Fenn et al.
4,999,492 A 3/1991 Nakagawa
5,412,208 A 5/1995 Covey et al.
5,436,446 A 7/1995 Jarrell et al.
5,559,326 A 9/1996 Goodley et al.
5,747,799 A 5/1998 Franzen
5,756,994 A 5/1998 Bajic
5,811,820 A * 9/1998 Kirchner et al. ........ 250/432 R
5,965,884 A 10/1999 Laiko et al.
6,060,705 A * 5/2000 Whitehouse et al. ....... 250/288
6,207,954 B1 3/2001 Andrien et al.
6,239,428 B1 5/2001 Kunz
6,610,986 B1 8/2003 Hartley

FOREIGN PATENT DOCUMENTS

JP 4215329 8/1992
JP 10088798 4/1998
WO WO- 99/63576 12/1999
WO WO 03/010794 A2 2/2003

* cited by examiner

*Primary Examiner*—Nikita Wells
*Assistant Examiner*—Zia R. Hashmi

(57) ABSTRACT

A thin laminated high transmission electro-optical lens populated with a plurality of apertures in communication with its laminates used to improve the collection, focusing, and selection of ions generated from atmospheric pressure sources, such as electrospray, atmospheric pressure chemical ionization, inductively coupled plasma, discharge, photoionization and atmospheric pressure matrix assisted laser desorption ionization. The laminated lens is made of alternating layers of electrically insulating and metal laminates. The geometry of the lens may be planar or shaped into various curve shapes, any of which act to optimize both the direct current (DC) and alternate current (AC) electric field geometries and strengths across the lens for transferring virtually all the ions from the ion source into an ion-focusing region adjacent and upstream of a high pressure or atmospheric pressure interface to a mass spectrometer, ion mobility analyzer, or combination thereof. Embodiments of this invention are methods and devices for improving sensitivity of mass spectrometry when coupled to high pressure or atmospheric pressure ionization sources.

20 Claims, 26 Drawing Sheets

Hemispherical

4A.

Conical

4B.

Tubular

4C.

Planar

4D.

LAMINATED LENS FOR FOCUSING IONS FROM ATMOSPHERIC PRESSURE

GOVERNMENT SUPPORT

The invention described herein was made in the course of work under a grant from the Department of Health and Human Services, Grant Number: 1 R43 RR143396-1. The U.S. Government may have certain rights to this invention.

CROSS-REFERENCE TO RELATED APPLICATION

This application is related to patent application Ser. No. 09/877,167, filed 2001 Jun. 8, now U.S. Pat. No. 6,744,041, issued 2004 Jun. 1, entitled "Apparatus and method for focusing ions and charged particles at atmospheric pressure;" patent application Ser. No. 10/449,147, filed 2003 May 31, now U.S. Pat. No. 6,818,889, issued 2004 Nov. 16, entitled "Laminated lens for focusing ions from atmospheric pressure;" patent application Ser. No. 10/449,344, filed 2003 May 30, entitled "Remote reagent chemical ionization source;" patent application Ser. No. 10/661,842, filed 2003 Sep. 12, entitled "Laminated lens for introducing gas-phase ions into the vacuum systems of mass spectrometers;" and patent application Ser. No. 10/668,021, filed 2003 Oct. 17, entitled "Laminated tube for the transport of charged particles contained in a gaseous medium;" patent application Ser. No. 10/785,441, filed 2004 Feb. 23, entitled "Ion and charged particle source for production of thin films;" patent application Ser. No. 10/893,130, filed 2004 Jun. 7, entitled "Ion enrichment aperture arrays;" and patent application Ser. No. 10/862,304, filed 2004 Jun. 7, entitled "Laser Desorption Ion Source."

SEQUENCE LISTING OF PROGRAM

Not Applicable

BACKGROUND

1. Field of Invention

This invention relates to methods and devices for improved collection and focusing of ions and charged particles generated at or near atmospheric pressure for introduction into the mass spectrometer, ion mobility or ion and charged particle or droplet deposition onto targeted surfaces.

2. Description of Prior Art

The generation of ions at atmospheric pressure is accomplished by a variety of means; including, electrospray (ES), atmospheric pressure chemical ionization (APCI), atmospheric pressure matrix assisted laser desorption ionization (MALDI), discharge ionization, $^{63}$Ni sources, inductively coupled plasma ionization, and photoionization. A general characteristic of all these atmospheric sources is the dispersive nature of the ions once produced. Needle sources such as electrospray and APCI disperse ions radially from the axis in high electric fields emanating from needle tips. Aerosol techniques disperse ions in the radial flow of gases emanating from tubes and nebulizers. Even desorption techniques such as atmospheric pressure MALDI will disperse ions in a solid angle from a surface. The radial cross-section of many dispersive sources can be as large as 5 or 10 centimeters in diameter. As a consequence of a wide variety of dispersive processes, efficient sampling of ions from atmospheric pressure sources to small cross-sectional targets or through small cross-sectional apertures and tubes (usually less than 1 mm) into a mass spectrometer becomes quite problematic. This is particularly amplified if the source of ions is removed from the regions directly adjacent to the aperture.

The simplest approach to sampling dispersive atmospheric sources is to position the source on axis with a sampling aperture or tube. The sampling efficiency of simple plate apertures is generally less than 1 ion in $10^4$. Devices developed by Fite (U.S. Pat. No. 4,209,696) used pinhole apertures in plates with electrospray. Devices developed by Laiko and Burlingame (W.O. Pat. No. 99/63576 and U.S. Pat. No. 5,965,884) used aperture plates with atmospheric pressure MALDI. An atmospheric pressure source by Kazuaki et al (Japan Pat. No. 04215329) is also representative of this inefficient approach. This general approach in severely restricted by the need for precise aperture alignment and source positioning and very poor sampling efficiency.

A wide variety of source configurations utilize conical skimmer apertures in order to improve collection efficiency over planar devices. This approach to focusing ions from atmospheric sources is limited by the acceptance angle of the field generated at the cone. Generally, source position relative to the cone is also critical to performance, although somewhat better than planar apertures. Conical apertures are the primary inlet geometry for commercial ICP/MS with closely coupled and axially aligned torches. Examples of conical-shaped apertures are prevalent in ES and APCI (U.S. Pat. No. 5,756,994), and ICP (U.S. Pat. No. 4,999,492) inlets. As with planar apertures, source positioning relative to the aperture is critical to performance and collection efficiency is quite low.

One focusing alternative utilizes a plate lens with a large hole in front of an aperture plate or tube for transferring sample into the vacuum system. The aperture plate is generally held at a high potential difference relative to the plate lens. The configuration creates a potential well that penetrates into the source region and has a significant improvement in collection efficiency relative to the plate or cone apertures. This configuration has a clear disadvantage in that the potential well resulting from the field penetration is not independent of ion source position, or potential. High voltage needles can diminish this well. Off-axis sources can affect the shape and collection efficiency of the well. Optimal positions are highly dependent upon both flow (gas and liquid) and voltages. They are well suited for small volume sources such as nanospray. Larger flow sources become less efficient and problematic. Because this geometry is generally preferential over plates and cones, it is seen in most types of atmospheric source designs. We will call this approach the "Plate-well" design which is reported configured with apertures by Labowsky et al. (U.S. Pat. No. 4,531,056), Covey et al. (U.S. Pat. No. 5,412,209) and Franzen (U.S. Pat. No. 5,747,799). There are also many Plate-well designs configured with tubes reported by Fenn et al. (U.S. Pat. No. 4,542,293), Goodley et al. (U.S. Pat. No. 5,559,326), and Whitehouse et al. (U.S. Pat. No. 6,060,705).

Several embodiments of atmospheric pressure sources have incorporated grids in order to control the sampling. Jarrell and Tomany (U.S. Pat. No. 5,436,446) utilize a grid that reflected lower mass ions into a collection cone and passed large particles through the grid. This modulated system was intended to allow grounded needles and float the grid at high alternating potentials. This device had limitations with duty cycle of ion collection in a modulating field (non-continuous sample introduction) and spatial and positioning restrictions relative to the sampling aperture.

Andrien et al. (U.S. Pat. No. 6,207,954 B1) used grids as counter electrodes for multiple corona discharge sources configured in geometries and at potentials to generated ions of opposite charge and monitor their interactions and reactions. This specialized reaction source was not configured with high field ratios across the grids and was not intended for high transmission and collection, rather for generation of very specific reactant ions. An alternative atmospheric pressure device by Yoshiaki (Japan Pat. No. 10088798) utilized hemispherical grids in the second stage of pressure reduction. Although the approach is similar to the present device in concept, it is severely limited by gas discharge that may occur at low pressures if higher voltages are applied to the electrodes and does not address the phenomena that most of the ions are lost at the cone-aperture interface—from atmospheric pressure into the first pumping stage.

Grids are also commonly utilized for sampling ions from atmospheric ion sources utilized in ion mobility spectrometry (IMS). Generally, for IMS analysis ions are pulsed through grids down a drift tube to a detector as shown in Kunz (U.S. Pat. No. 6,239,428B1). Great effort is made to create planar plug of ions in order to maximize resolution of components in the mobility spectrum. These devices generally are not continuous, nor do they require focusing at extremely high compression ratios.

SUMMARY

A preferred embodiment of the invention is the configuration of a Laminated High Transmission Element (L-HTE) (as shown in FIG. 8A), comprising layers of conducting surfaces with annular openings, each conducting layer separated by electrically insulating bases. The L-HTE is configured downstream from any of a variety of atmospheric pressure sources and upstream from an Inner Field-Shaping Electrode and a conducting collector surface (aperture plate or tube). Ions generated in a relatively large volumetric area of an atmospheric pressure source are attracted toward the top surface of the L-HTE by an attracting potential relative to the source region.

The field ratio, the field strength on the source side of the high transmission element relative (generally 2–10× less) to the field within the annular openings requires that the ions from the source region are transmitted through the openings in the L-HTE and further transmitted to a collection region downstream from the L-HTE. In this operating condition, the field from the collector side of the L-HTE penetrates into the source side of the L-HTE and accelerates appreciably all of the ions through the openings in the L-HTE surface. A good value of a field ratio is greater than 10.

The L-HTE is typically manufactured so to allow ions or charged particles to pass easily through the L-HTE surface. This entails having a L-HTE with a low depth aspect ratio, referring to the ratio of the dimension of the openings to the thickness of the L-HTE surfaces; where the thickness of the insulating base and metal laminates are as thin as mechanically possible. In addition, the openness of the L-HTE is also important. Typically the openness, the ratio of the dimension of the opening to the entire surface area should be as large as possible to allow the field from the metal laminated on the collector side to penetrate through the metal laminated on the source side of the L-HTE and into the source side several opening diameters away from the source side surface of L-HTE.

The focusing side metal laminate of the L-HTE and the inner field-shaping electrode are held at approximately the same potential relative to the collector surface which is held at a high potential difference to attract virtually all ions that cross the L-HTE, through a relatively large aperture in the inner field-shaping electrode, onto the collector surface (or through an aperture into the a vacuum). The combination of L-HTE shape, Inner Field-shaping Electrode aperture size, and potential difference (between the L-HTE and the collector) affect substantial compression of the dispersed ions into a small cross-sectional beam at the collector. When this beam is precisely aligned with a vacuum sampling aperture into a mass spectrometer, very high sensitivities are achieved.

The physical separation of the ionization source region from the deep potential-well focusing region by the L-HTE solves many of the efficiency problems associated with conventional approaches to ion collection at atmospheric pressure. With the present invention, the requirement of focusing the dispersed ions through a single small opening in the source region is eliminated; rather, the ions are allowed to drift toward a relatively large front surface of the L-HTE. In this way all ions from a given source can be collected across an appropriately sized and shaped L-HTE surface, then focused downstream away from the often-high fields associated with the source region.

OBJECTS AND ADVANTAGES

One object of the present invention is to increase the collection efficiency of ions and/or charged particles at a collector, or through an aperture or tube into a vacuum system, by creating a very small cross-sectional area beam of ions and/or charged particles from highly dispersed atmospheric pressure ion sources. Another object of the present invention is to increase the transmission efficiency of ions from atmospheric pressure ion sources to a target collector, or through an aperture or tube. The present invention has a significant advantage over prior art in that the use of a Laminated High Transmission Element (L-HTE) to separate the regions of ion generation from ion focusing allows precise shaping of fields in both regions. Ions can be generated in large ion source regions without losses to walls. Droplets have longer time to evaporate and/or desorb ions without loss from the sampling stream. Source temperatures can be lower because rapid evaporation is not required. This can prevent thermal decomposition of some labile compounds. Counter electrodes for electrospray needles do not have to be the plate lens as practiced with most convention sources or even the L-HTE. The aerosol can be generated remotely and ions can be allowed to drift toward the L-HTE.

Another object of the present invention is to have collection efficiency be independent of ion source position relative to the collection well. With the present invention there is no need for precise mechanical needle alignment or positioning relative to collectors, apertures, or tubes. Ions generated at any position in the ion source region are transmitted to the collector, aperture, or tube with similar efficiency. No existing technology has positional and potential independence of the source. The precise and constant geometry, and alignment of the focusing well with sampling apertures will not change with needle placement. The fields inside (focusing side) the well will not change, even if they change outside (source side).

Another object of the present invention is the independence of ion source type. This device is capable of transmission and collection of ions from any atmospheric (or near atmospheric) source; including, electrospray, atmospheric pressure chemical ionization, atmospheric pressure MALDI (laser desorption), inductively coupled plasma, discharge sources, $^{63}Ni$ sources, spray ionization sources, induction ionization sources and photoionization sources. The device is also capable of sampling ions of only one polarity at a time, but with extremely high efficiency.

Another object of the present invention is to efficiently collect and/or divert a flow of ions from more than one source. This can be performed in a simultaneous fashion for introduction of mass calibrants from a separate source and analytes from a different source at a different potential; conversely, it can be performed sequentially as is typical with multiplexing of multiple chromatographic streams introduced into one mass spectrometer.

Another object of the present invention is to efficiently transmit ions to more than one target position. This would have the utility of allowing part of the sample to be collected on a surface while another part of the sample is being introduced through an aperture into a mass spectrometer to be analyzed.

Another object of the present invention is to improve the efficiency of multiplexed inlets from both multiple macroscopic sources and micro-chip arrays, particularly those developed with multiple needle arrays for electrospray. Position independence of this invention makes it compatible with a wide variety of needle array technologies and multi-well plates for surface desorption techniques.

Another object of the present invention is to remove larger droplets and particles from aerosol sources with a counter-flow of gas to prevent contamination of apertures, tubes, and vacuum components.

Another object of the present invention is to collect all the ions or charged particles or droplets at the outer surface (upstream side) of the L-HTE but to also be able to selectively and spatially sample a select group of ions through the surface. Allowing the efficient application or deposition of charged compounds on a surface in patterns determined by the shape of the L-HTE, whether the opening permits the transfer of the charged compounds, or by the shape and size of the openings.

Another objective of the present invention is that the precise alignment of the individual openings of the L-HTE with a combination of electrostatic potentials and gas flows, both concurrent and countercurrent, substantially all of the charged compounds can be transferred through the surface.

An advantage of the present device is the independence of collection efficiency of a source of ions from the sampling efficiency of the ions into a gas-phase ion analyzer. Multiple sources are able to be uniformly collected with this invention. Multiple focal points can also be configured if there is need to collect part of the sample and analyze another part.

An additional advantage of the present device is that the addition of gas flow, concurrent and countercurrent to the motion of the ions, provides additional focusing to the ions passing through the L-HTE. As the ions move through the L-HTE a countercurrent flow of gas focuses the ions toward the center of the openings, away from surfaces, and as the ions exit the openings a concurrent flow of gas prevents their radial dispersion focusing the ions axially; whereby the electrostatic direct current potential ratio across the L-HTE can be less than 1.

An important advantage of this device is to enable ions to be deflected away from the axis of the atmospheric source by tuning a front electrode on the L-HTE and refocusing the ions downstream by tuning a back electrode. This embodiment enables axial removal of larger particles and also the axial input of drying gas, heated or unheated, with out degrading the ion transmission process.

One object of an alternative embodiment of this device is the addition of a counterflowing source of reagent ions on axis with the flow of sample molecules to facilitate ion-molecule reactions or ion-particle charging in front or upstream of the L-HTE; and the radial dispersion and efficient transmission through the L-HTE and collection of reaction products of the ion-molecule reactions or ion-particle charging downstream of the L-HTE for deposition or chemical analysis.

An additional embodiment of this invention incorporates RF frequencies to at least one of the inner conduction electrodes in order to add a degree of selectivity to the transmission of ions through the L-HTE. We envision RF on one layer, phase separated RF on adjacent sides of a single but thicker layer with annular openings, and phase separated asymmetric RF on adjacent sides of a single but thicker layer with annular openings, or combinations thereof.

A primary objective of the present invention is to accommodate efficient collection and transmission of ions and charged particles generated at, above, or near atmospheric pressure from a wide variety of natural and synthetic sources such as, but not limited to, spraying, chemical ionization, sputtering, desorption, condensation, plasma, radioactive, etc.

DRAWING FIGURES

In the drawings, closely related figures have the same number but different alphabetic suffixes.

FIGS. 1A to 1C show cross-sectional illustrations of a planar laminated high-transmission element (L-HTE) configuration consisting of two metal laminates with three alternative operating modes; namely, (A) a laminate in transmission mode with relatively equal fields or symmetric fields on either side of laminate surface, (B) a laminate in back-collection mode due to high relative field (asymmetric fields) on ion source side of laminate surface, and (C) asymmetric fields with unequal fields on either side of surface and concurrent flow of gas to compensate for asymmetric field penetration.

FIGS. 2A and 2B show a potential energy surface of a laminated high-transmission element (L-HTE) comprised of three metal laminates with individually addressable elements in the center laminate that allow discrete control of transmission through the individual openings, (A) showing position 2 closed and positions 1, 3, and 4 open to ion flow, and (B) showing positions 1 and 3 closed and positions 2 and 4 open to ion flow.

FIG. 3 shows the center layer of a discrete controllable openings in a laminated high-transmission element (L-HTE) comprised of three metal laminates described in FIG. 2 with digital or analog control.

FIGS. 4A to 4D shows cross-sectional illustrations of various surface shapes of a laminated high-transmission element (L-HTE) with the base partially removed between the two metal laminates (A) hemispherical-shaped laminated high transmission element, (B) conical-shaped laminated high transmission element, (C) tubular-shaped laminated high transmission element, (D) planar-shaped laminated high transmission element.

FIGS. 5A to 5C shows a two layer laminated high-transmission element (L-HTE), illustrating (A) a cross-sectional illustration showing the focusing of ions from an ion source region, through the laminated element and subsequent transmission through an exit aperture, (B) a 3-dimensional cutaway of the device, (C) potential energy surface of the device showing the Ion Source, Funnel, and Deep-Well Regions.

FIGS. 6A to 6C shows a two-layer laminated high-transmission element (L-HTE) where one of the metal laminates is also used as atmospheric-matrix-assisted laser desorption (AP-MALDI) target with (A) a cross-sectional illustration showing the focusing of desorbed ions desorbed from the ion source region, through the laminated element and subsequent transmission through an exit aperture, (B) a 3-dimensional cutaway of the device, (C) a partial view of the potential energy surface of the device showing the Ion Source, Funnel, and Deep-Well Regions.

FIGS. 7A to 7F show perspective views of six alternative hemispherical shaped laminated high-transmission elements (L-HTE); showing the outer or upstream metal laminate (A) sheet metal with circular openings, (B) woven wire elements with square or rectangular openings, (C) cross-hatched wire electrodes showing similarly shaped openings, (D) stamped sheet metal with hexagonal apertures, (E) parallel wires with transverse slots or openings between individual wires, and (F) concentric wire hoops or rings with radial slots or openings.

FIGS. 8A to 8C shows a seven-layer laminated high-transmission element (L-HTE) with annular openings at a single radius from the axis of the electrospray nebulizer, (A) a cross-sectional illustration showing the focusing of ions from an electrospray ion source region, through the laminated element and subsequent transmission through an exit aperture, (B) expanded view of the L-HTE region showing saddle-shaped electric fields on both sides of the laminate, and (C) a potential energy surface of the device showing the motion of ions from the Ion Source, and through the Funnel and Deep-Well Regions.

FIGS. 9A to 9B shows a laminated high-transmission element (L-HTE) with annular openings, (A) a cross-sectional illustration showing the focusing of ions from an APCI ion source region, through the laminated element and subsequent transmission through an exit aperture, and (B) a counterflow of reagent ions generated within the boundaries of the L-HTE surfaces allowing axial introduction of reagent ions counter to the flow of sample.

FIG. 10 shows a similar laminated high-transmission element (L-HTE) with annular openings with an inductively coupled plasma source upstream of the L-HTE.

FIG. 11 shows a laminated high-transmission element (L-HTE) with annular openings, (A) a cross-sectional illustration showing the focusing of ions from an electrospray ion source region, through the laminated element and subsequent transmission through an annular-shaped exit aperture, and (B) a front view of the patterned exit aperture, through which ions and charged particles are focused from a the matched L-HTE annular pattern of the L-HTE.

Figure 15:
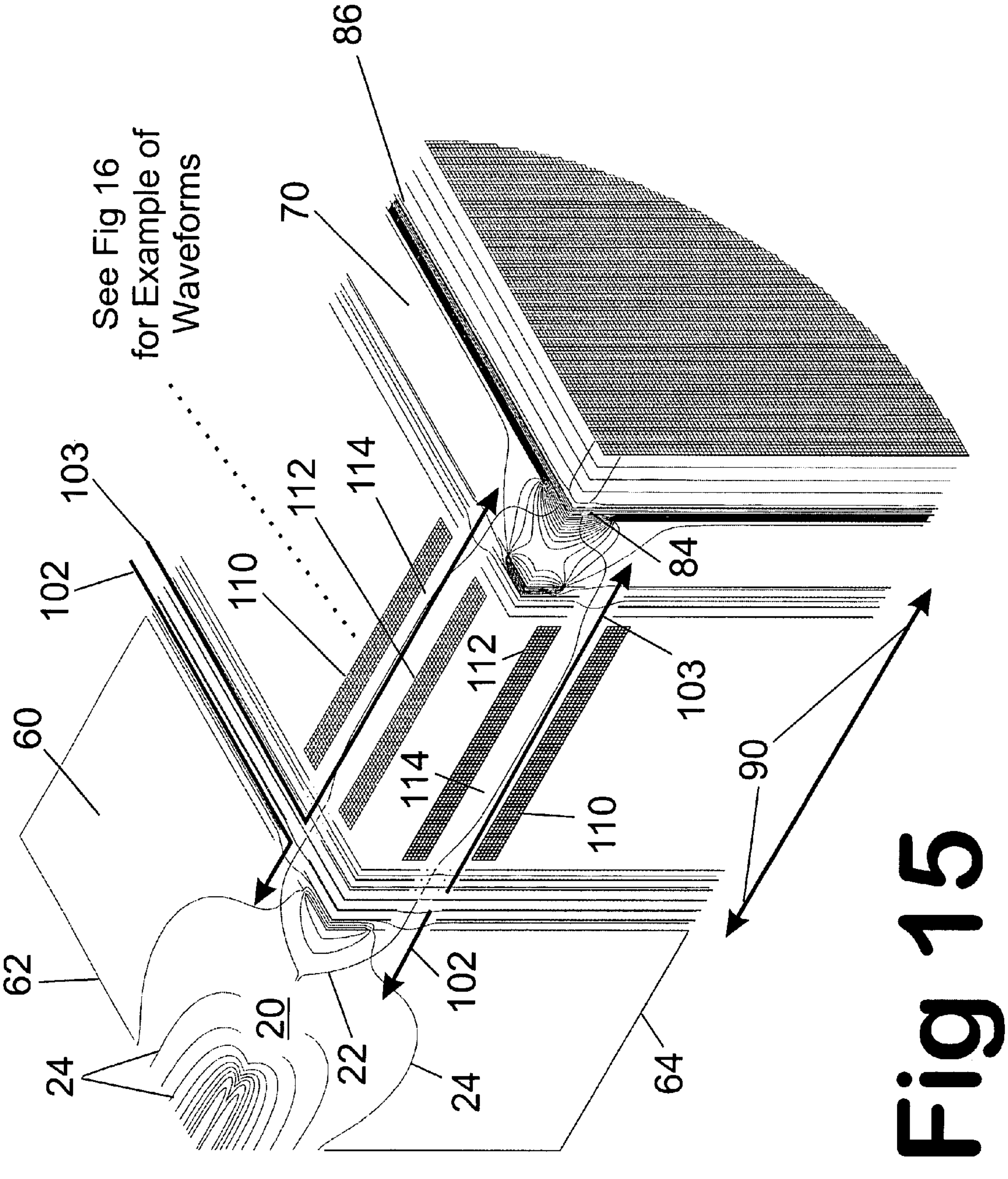
FIG. 15 shows a cutaway view of a L-HTE assembly comprised of inner and outer RF (radio frequency) laminates, in order to select ions and charged particles based on mobility characteristics.
Figure 16B:
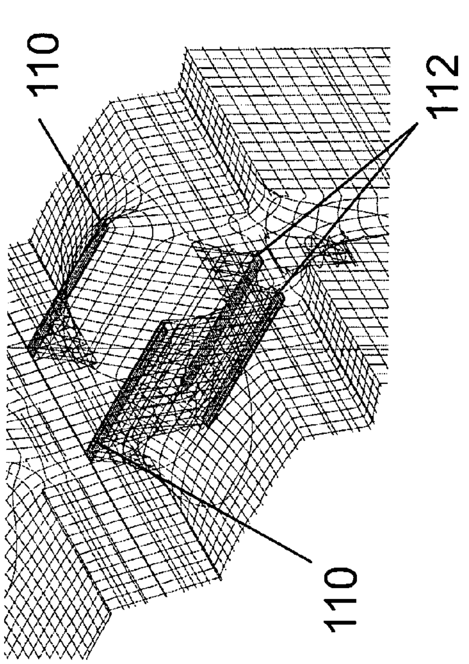
Figure 16C:
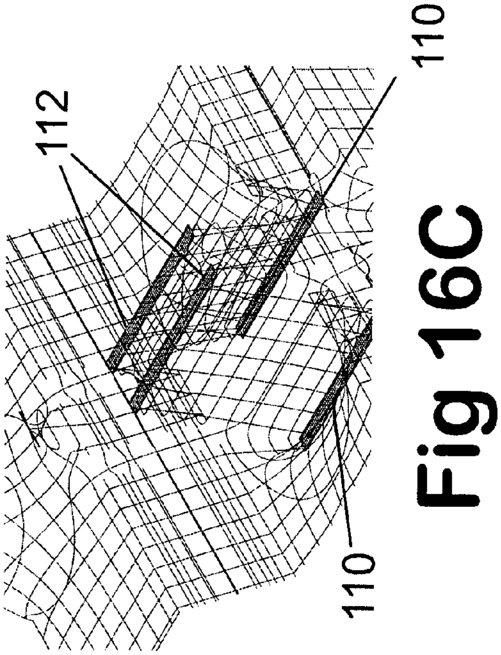
Figure 16A:
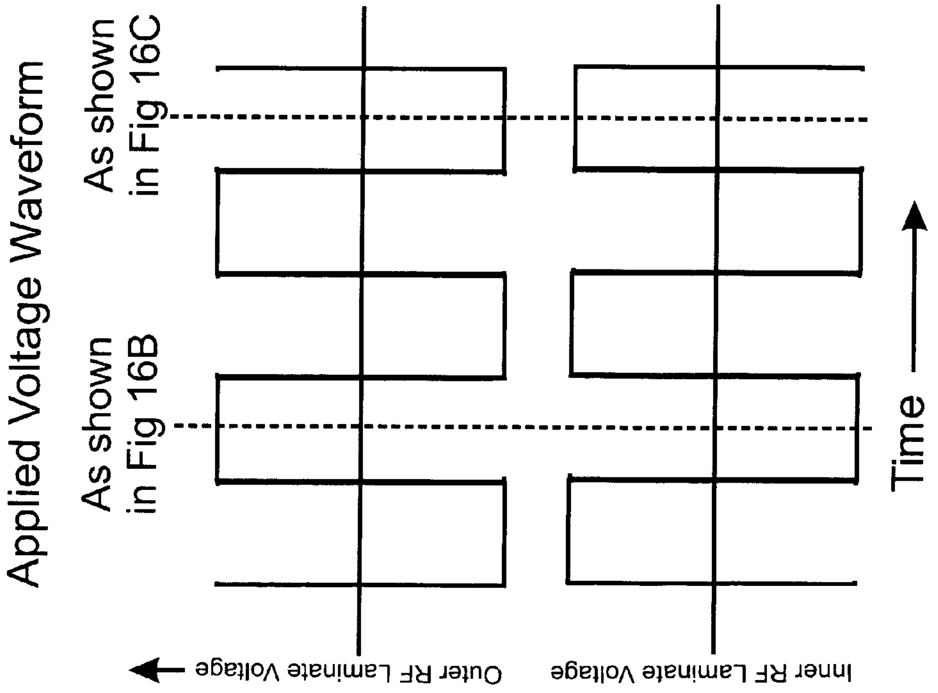

FIGS. 16A, 16B, and 16C shows, (A) one alternative of a symmetric waveform applied to the inner and outer RF laminates of FIG. 15, with (B) the potential surface of the L-HTE with the outer RF laminate maximized, and (C) the potential surface of the L-HTE with the inner RF laminate maximized.

REFERENCE NUMBERS IN DRAWINGS

2 first saddle-field region
4 second saddle-field region
10 sample source
11 control means
12 sample delivery means
13 gas supplies
14 laser source
15 high voltage power supplies
16 incident laser beam
17*a* nebulizer gas flow controller (optional)
17*b* source gas flow controller (optional)
17*c* laminate gas flow controller (optional)
17*d* funnel region gas flow controller (optional)
17*e* aperture counterflow gas flow controller (optional)
18 heater supplies
19 exhaust destinations
20 ion source
21 reagent ion source
22 ion trajectories
24 equipotential lines
25 electrospray nebulizer
26 needle electrode
27 discharge needle
28 APCI heated nebulizer
29 ICP torch
30 concurrent gas source
32 concurrent gas inlet
40 countercurrent gas source
42 countercurrent gas inlet
44 front axial tuning electrode
45 back axial tuning electrode
46 laminated grid
50 exhaust destination
53 annular opening
54 electrical feedthrough
55 gas feedthrough
56 axial tuning electrode opening
57 alignment post openings
58 annular opening bridge
59 alignment posts
60 ion source region
62 ion source entrance wall
63 window
64 ion source cylindrical wall
66 insulator ring
67 insulator ring
68 insulator ring
70 ion funnel region
72 funnel region lens or electrode
76 funnel lens aperture
80 deep-well region

82 deep-well ring insulator
84 exit aperture
86 exit wall
90 laminated-high transmission element (L-HTE)—(aggregate)
91 laminate electrode
92 laminate insulator
93 layer containing independently addressable openings
95 discrete opening electrode
95*a* discrete opening electrode—position 1
95*b* discrete opening electrode—position 2
95*c* discrete opening electrode—position 3
95*d* discrete opening electrode—position 4
96 outer electrode
97 analog or digital control means
98 laminate lamination openings
100 ion destination region
102 countercurrent focusing gas flow path
103 concurrent gas flow path
104 countercurrent drying gas flow path
105 countercurrent reagent gas flow path
106 reagent gas flow path
110 outer rf laminate
112 inner rf laminate
114 interstitial space
120 MALDI target disk

DETAILED DESCRIPTION—FIGS. 8A THRU 8C, 9A, 9B, 10, 11, 14B, AND 14C—PREFERRED EMBODIMENT

[Laminated Focusing Device with Seven Metal Laminates and Annular Openings]

A preferred embodiment of the present invention is an ion or particle transmission and focusing device utilizing a laminated high transmission element, atmospheric lens or just abbreviated as L-HTE 90 as illustrated in 8A thru 8C. Sample from a source 10 is delivered to an ion source 20 by a delivery means 12 through an ion source entrance wall 62. Wall 62 is electrically isolated from an ion source cylindrical wall 64 by a ring insulator 66. Wall 64 is isolated from the L-HTE 90 by a ring insulator 68. The device includes an atmospheric pressure or near atmospheric pressure ion source region 60 from which ions originating from the source 10 are delivered or, alternatively, neutral species are ionized in the ion source 20. This device is intended for use in collection and focusing of ions from a wide variety of ion sources; including, but not limited to electrospray 25 (as shown in FIG. 8), atmospheric pressure chemical ionization 28, photo-ionization, electron ionization, laser desorption (including matrix assisted), inductively coupled plasma 10, discharge ionization, charged aerosols and ions sampled from nature, etc. Alternatively the ions may be supplied by ion separating or focusing devices; including, but not limited to ion mobility spectrometers.

Downstream of the ion source region 60 is the L-HTE 90, composed of laminations comprising conducting or metal laminates, surfaces, or electrodes from 91*a*, the upstream side of the L-HTE, to 91*g*, the downstream side. These conducting laminate electrodes are separated by laminate insulators layers 92*a* to 92*f*, respectively. The surface of the L-HTE 90 is populated with a number of lamination openings or apertures (here annular-shaped) 98 through which ions are transmitted from the ion source region 60 to an ion funnel region 70 which is downstream of the L-HTE 90. Funnel region 70 is bounded by 74 an insulator 67, laminate

91*g*, and a funnel region lens 72. Voltage is applied to each laminate electrode through a supply 15 and controlled by a control means 11. A DC potential is applied to each laminate, electrode, wall, or lens creating electric fields (indicated by equipotential lines 24), although a single power supply in conjunction with a resistor chain can also be used, to create the desired net motion of ions, as shown by generalized ion trajectories 22, from the ion source region 60, through the openings 98 of the L-HTE 90, into the ion funnel region 70, through a funnel lens aperture 76 into a deep-well region 80 where they are accelerated toward an exit aperture or sets of apertures 84 in an exit wall 86 to an ion destination region 100.

Into the annular-shaped openings 98 the ions are steered off axis by the saddle-shaped electric fields that are created by virtue of a front axial tuning electrode 44. Conversely, the ions can be attracted back toward the axis as they exit the annular opening 98 by a back axial tuning electrode 45. A first saddle-shaped field 2 is observed upstream from electrode 44 and a second saddle-shaped field 4 is observed downstream from electrode 45.

Exit wall 86 is isolated from the funnel region lens 72 by a deep-well ring insulator 82. Exit wall 86 is made of a conducting material or a conductively coated insulating material such as glass. In the case of vacuum detection, such as mass spectrometry in region 100, typical aperture 84 diameters are 100 to 500 um. The destination region 100 in this embodiment is intended to be the vacuum system of a mass spectrometer (interface stages, optics, analyzer, and detector) or other low-pressure ion and particle detectors.

Figure 10:
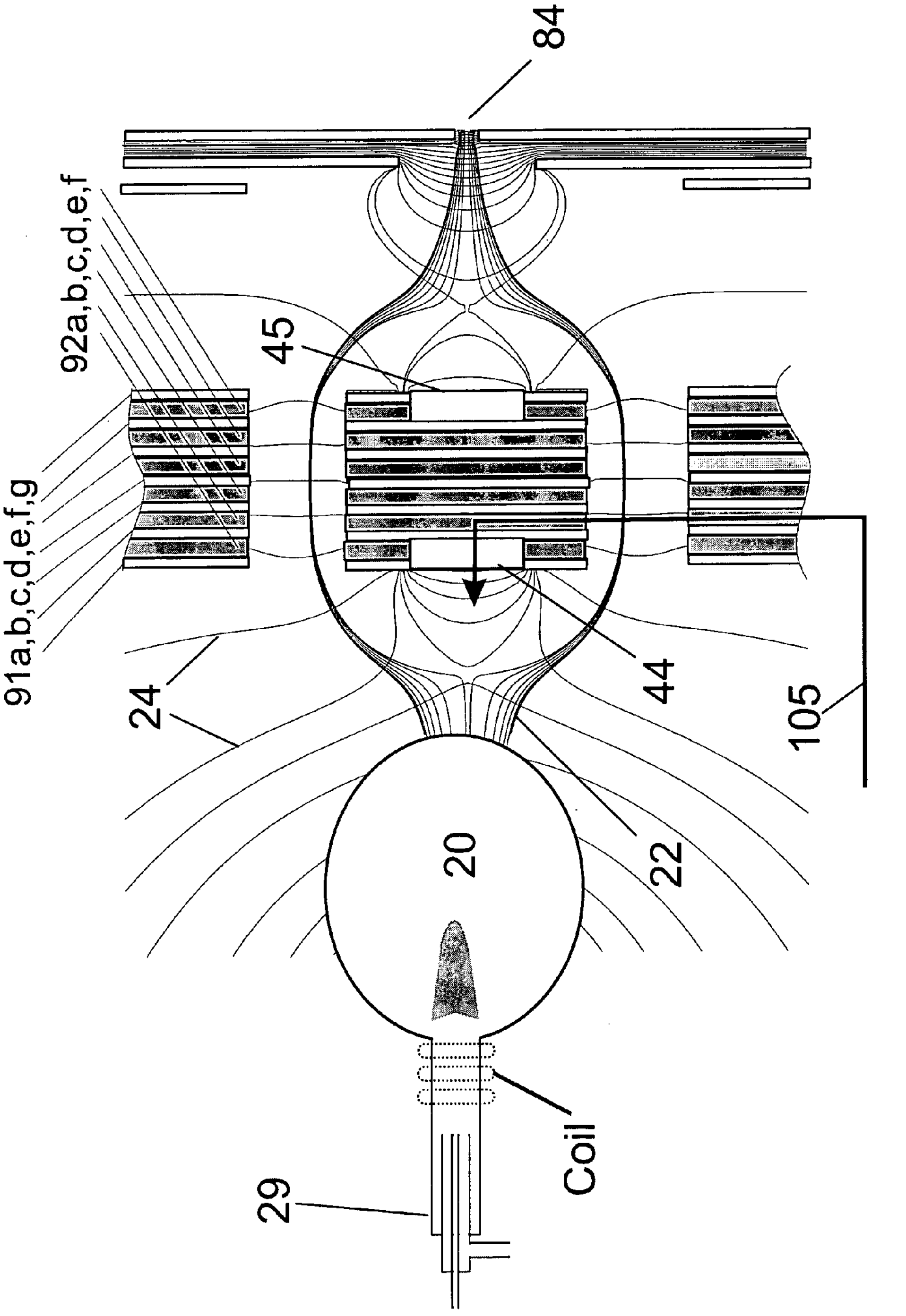
Figure 11A:
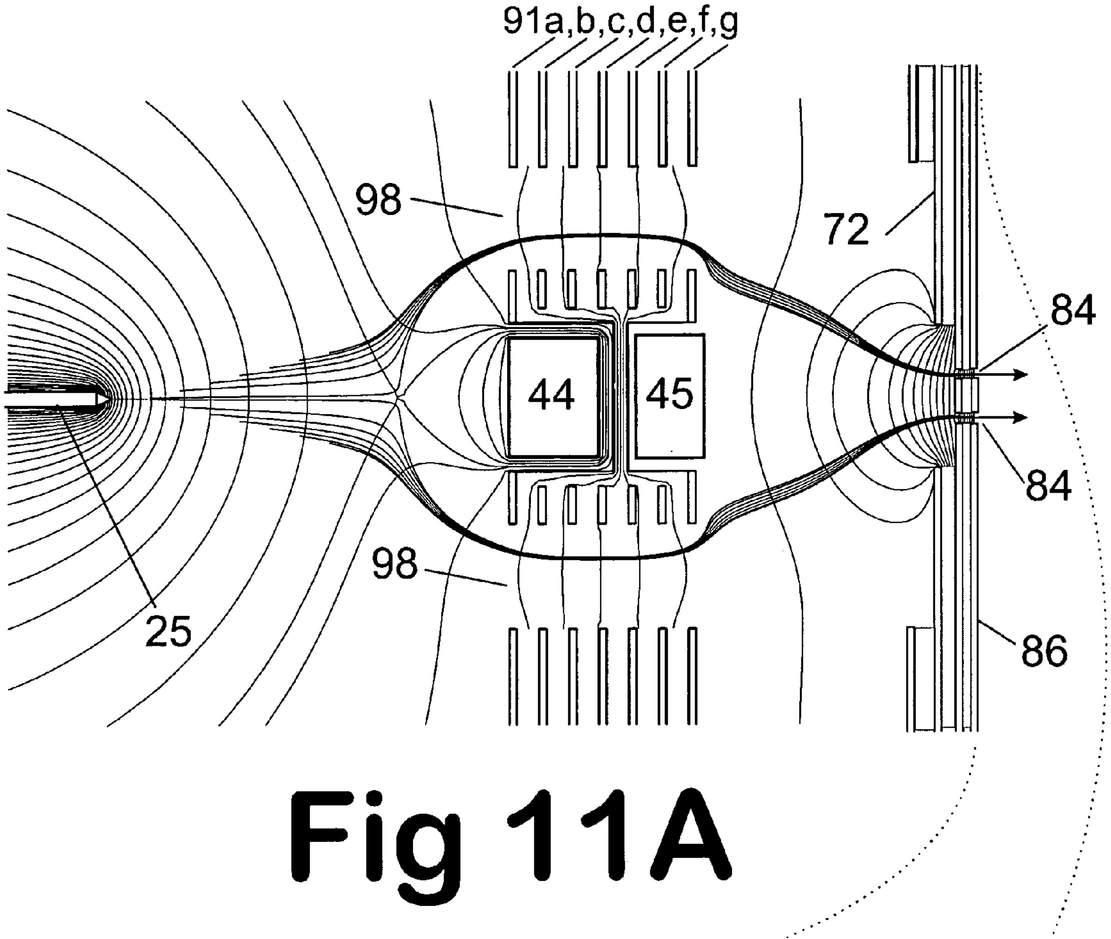
Figure 11B:
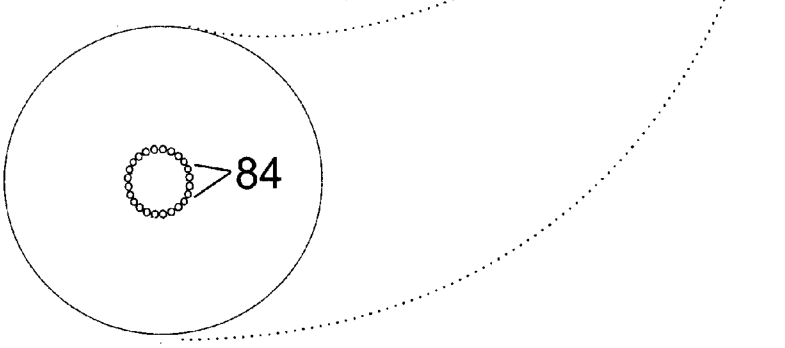
Figure 14A:
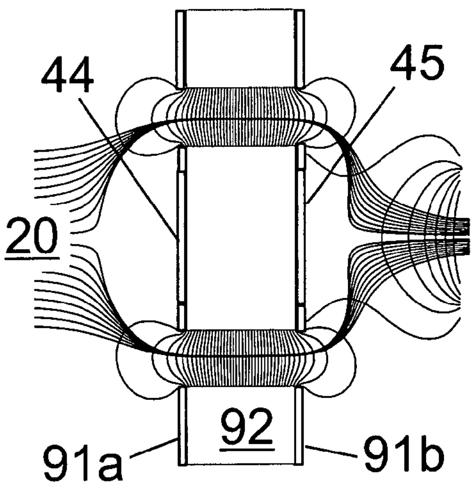
FIGS. 14A to 14C shows alternative embodiments of laminated high-transmission element (L-HTE) with annular openings, (A) a simple two-layer laminate with no gas flow, (B) a five-layer laminate with axial introduction of gas flowing out into the ion source and focusing regions, and (C) a seven-layer laminate with gas flow within the annular opening in both countercurrent and concurrent directions.
Figure 14B:
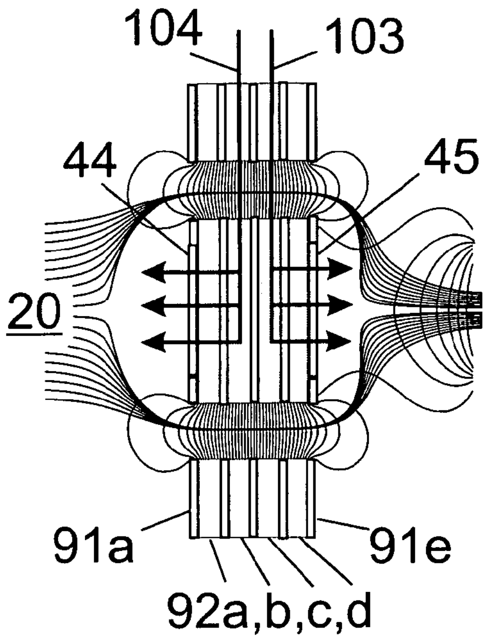
Figure 14C:
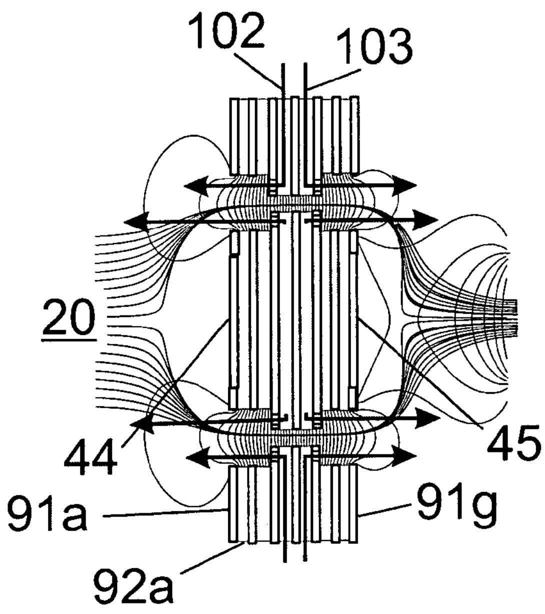

Gases, such as but not limited to air or nitrogen can be added to the ion source region 60 for concurrent flow gas from a gas supply 13 and introduced to various locations within the system through optional gas controllers 17*a* through 17*e*. For example, FIG. 10, shows gas being introduced into the ion source region 20 upstream of the L-HTE 90. Reagent gas flow 105 is metered by the controller 17*c* and introduced into the ion source region 20 through the upstream electrode 44, where in this embodiment the upstream electrode 44 is perforated allowing the gas to flow through the electrode and into the ion source region 20. While FIGS. 14B and 14C show both contercurrent focusing or drying gas flow 102, 104, and concurrent gas flow 103 being introduced into the L-HTE and delivered into both the ion source 20 and ion funnel 70 regions by either flowing out perforated axial focusing electrodes 44, 45; or through the laminate openings 98.

Excess gas can be exhausted to an exhaust destinations 19. All gas supplies can be regulated and metered and of adequate purity to meet the needs of the ion transmission and chemical analysis application. Gases may be heated through heater supplies 18 connected to individual gas controllers 17 and controlled through a control means 11.

All components of the device are generally made of chemically inert materials. In the preferred embodiment, the L-HTE insulator base 92 is an insulating material, such as glass or ceramic. However, it can consist of any other material that can isolate electrically the metal electrodes 91 from each other, such as nylon, polyimide, Teflon, poly ether ether ketone (PEEK), etc. The metal electrodes, 91, are composed of conductive materials, such as but not limited to stainless steel, brass, copper, gold, and aluminum. In this specific embodiment, the L-HTE 90 consists of seven planar-shaped laminated electrodes 91*a* to 91*g* of uniform cross-section with the annular-shaped openings 98 radially around the axis of the ion sources.

FIGS. 1A THRU 1C, 5A THRU 5C, AND 14A—ALTERNATE PERFERRED EMBODIMENT

[Laminated Focusing Device with Two Metal Laminates]

A alternate preferred embodiment of the present invention is an ion or particle transmission and focusing device utilizing the laminated high transmission element (L-HTE) 90 as illustrated in FIGS. 1 and 5. Sample from the source 10 is delivered to the ion source 20 by the delivery means 12 through the ion source entrance wall 62. Wall 62 is electrically isolated from an the ion source cylindrical wall 64 by the ring insulator 66. Wall 64 is isolated from the L-HTE 90 by the ring insulator 68. The device includes the atmospheric pressure or near atmospheric pressure ion source region 60 from which ions originating from the source 10 are delivered or, alternatively, neutral species are ionized in the ion source 20. This device is intended for use in collection and focusing of ions from a wide variety of ion sources; including, but not limited to electrospray, atmospheric pressure chemical ionization, photo-ionization, electron ionization, laser desorption (including matrix assisted), inductively coupled plasma, discharge ionization, charged aerosols and ions sampled from nature, etc. Alternatively the ions may be supplied by ion separating or focusing devices; including, but not limited to ion mobility spectrometers.

Downstream of the ion source region 60 is the L-HTE 90, composed of laminations 91 comprising the inner-91*a* and outer-91*b* laminates, surfaces, or electrodes, both conducting electrodes separated by the insulator layer or base 92. The surface of the L-HTE 90 is populated with a multitude of lamination openings or apertures 98 through which ions are transmitted from the ion source region 60 to the ion funnel region 70, which is downstream of the L-HTE 90. FIG. 14A shows an additional embodiment to the two laminates L-HTE, where axial tuning electrodes 44, 45 may be incorporated into the L-HTE to create saddle shaped fields upstream and downstream of the L-HTE, respectively.

Funnel region 70 is bounded by the insulator 82, the exit wall 86, and the funnel region lens 72. Individual DC potentials are applied to each laminate, electrode, wall, or lens creating an electric field (indicated by equipotential lines 24), although a single power supply in conjunction with a resistor chain can also be used, to create the desired net motion of ions, as shown by the generalized ion trajectories 22, from the ion source region 60, through the openings 98 of the L-HTE 90, into the ion funnel region 70, through the funnel lens aperture 76 into the deep-well region 80 where they are accelerated toward the exit aperture 84 in the exit wall 86 to the ion destination 100. Exit wall 86 is isolated from the funnel lens 72 by the deep-well ring insulator 82. Exit wall 86 is made of a conducting material or a conductively coated insulating material such as glass. In the case of vacuum detection, such as mass spectrometry in region 100, typical aperture 84 diameters are 100 to 500 um. The destination region 100 in this embodiment is intended to be the vacuum system of a mass spectrometer (interface stages, optics, analyzer, and detector) or other low-pressure ion and particle detectors.

Gases, such as but not limited to air or nitrogen can be added to the ion source region 60 for concurrent flow gas from a concurrent gas source 30 introduced through a concurrent gas inlet 32. Gas can also be added for countercurrent flow from a countercurrent gas source 40 through a countercurrent gas inlet 42. Alternatively, gas flowing in the concurrent and countercurrent direction may be added to the ion source region 60 and ion funnel region 70 by introducing the gas between inner-91*a* and outer-91*b* laminates, the gas flowing out of the openings 98 into the respective areas. Excess gas can be exhausted through an exhaust outlet 52 toward an exhaust destination 50. All gas supplies can be regulated and metered and of adequate purity to meet the needs of the ion transmission application.

All components of the device are generally made of chemically inert materials. In the preferred embodiment, the L-HTE insulator base 92 is an insulating material, such as glass or ceramic. However, it can consist of any other material that can isolate electrically the two metal electrodes 91 from each other, such as nylon, polyimide, Teflon, poly ether ether ketone (PEEK), etc. The metal electrodes, 91 are composed of conductive materials, such as but not limited to stainless steel, brass, copper, gold, and aluminum. In this embodiment the L-HTE 90 consist of planar-shaped laminated electrodes 91 of uniform cross-section with circular-shaped openings 98 evenly spaced across the L-HTE 90. Two perforated plates separated by an insulated layer are workable for the planar geometry, but for other shapes or geometries it is also possible to use molded materials for the base 92 and laminates 91 with the laminates consisting of material that is conducting or as non-conducting molded materials with subsequent deposition of conducting material on the surfaces of the laminates. Alternatively, the metal laminates 91 may be deposited on the base 92 by vapor deposition and the holes or apertures formed by ablating away the metal and base using a laser, or the L-HTE may be manufactured by using the techniques of microelectronics fabrication: photolithography for creating patterns, etching for removing material, deposition for coating the surfaces with specific materials, etc.

FIG. 9B—ALTERNATE PERFERRED EMBODIMENT

[Atmospheric Pressure Chemical Ionizations Source (APCI)]

Figure 9A:
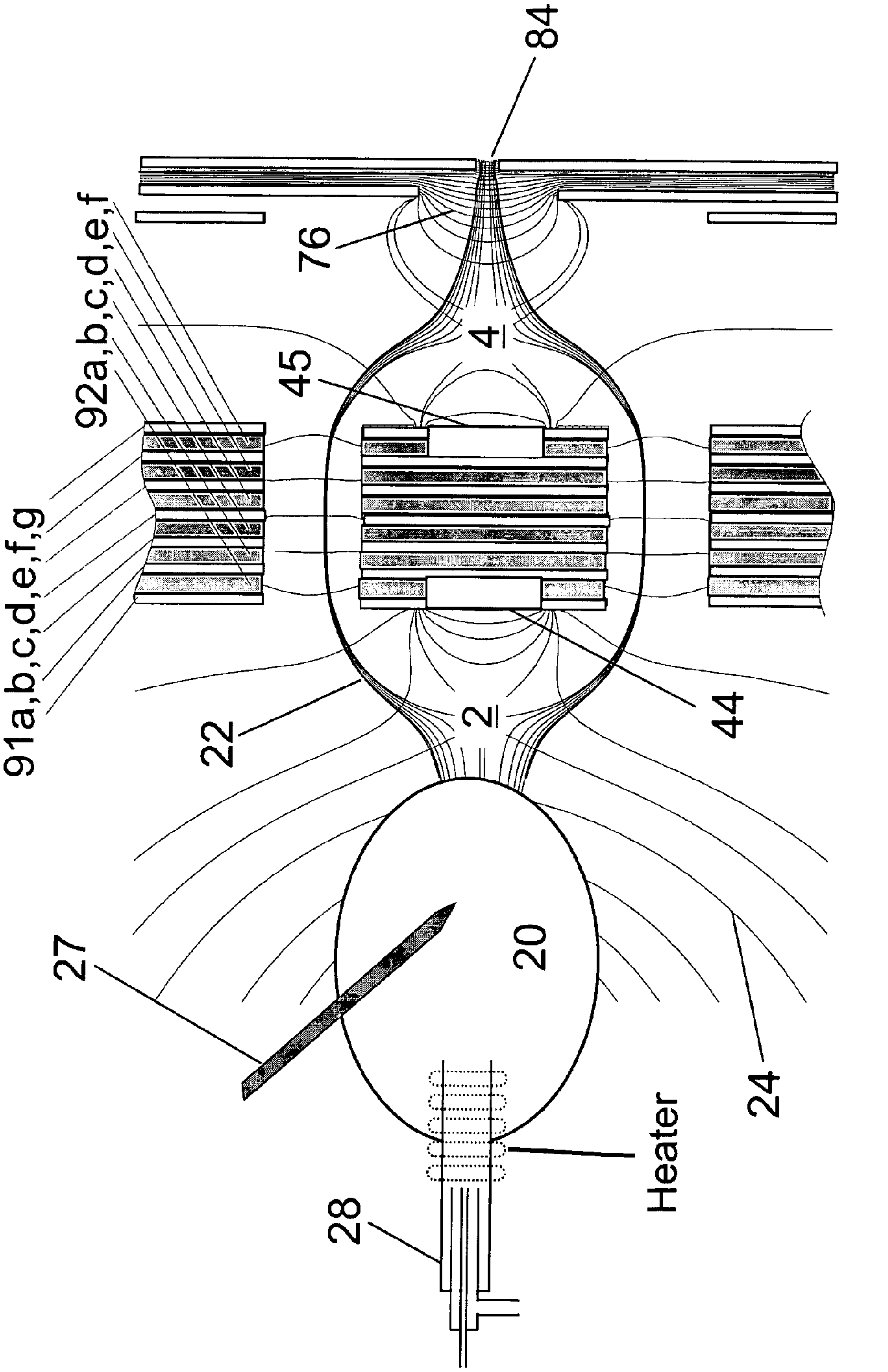
Figure 9B:
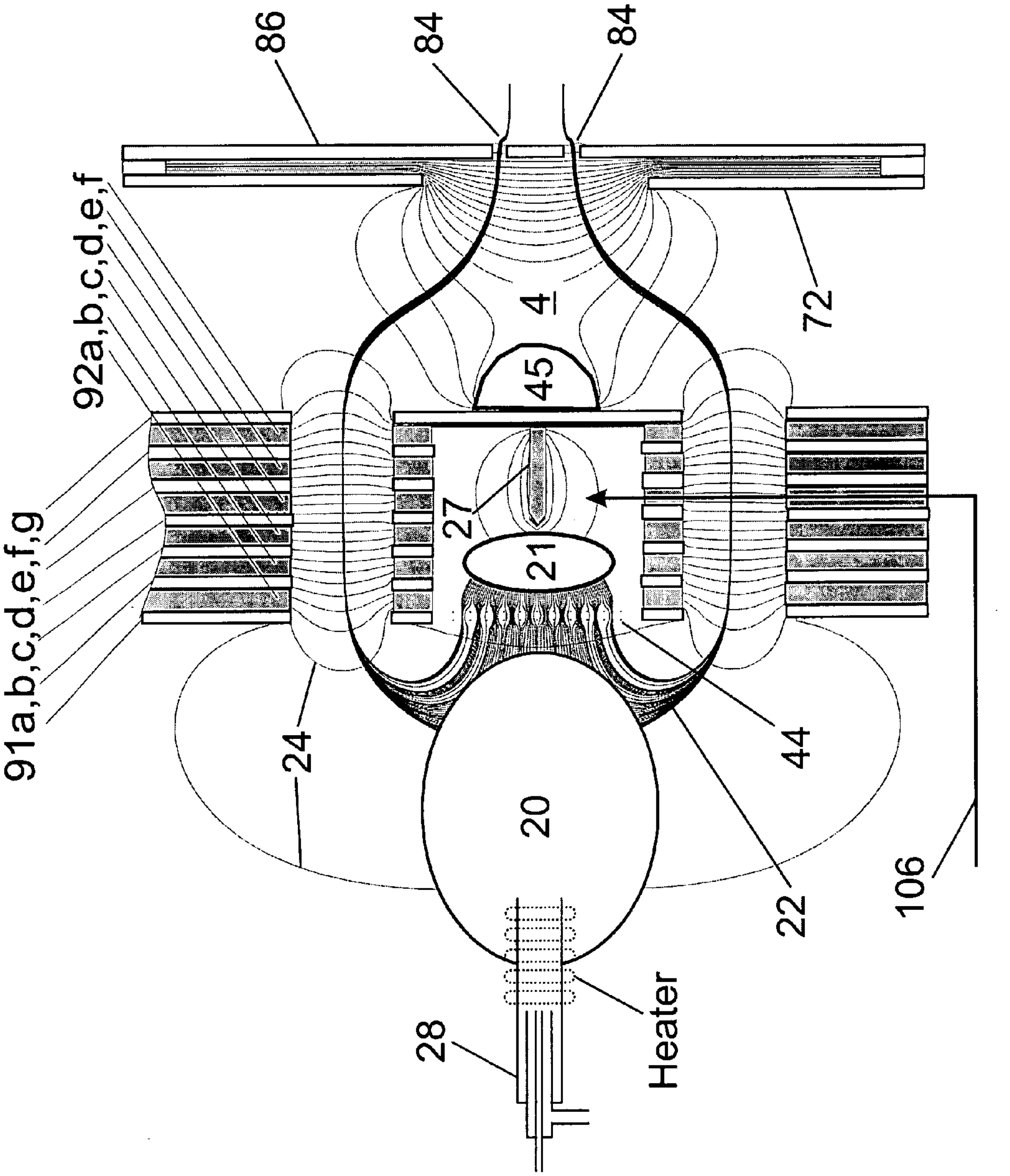
Figure 12:
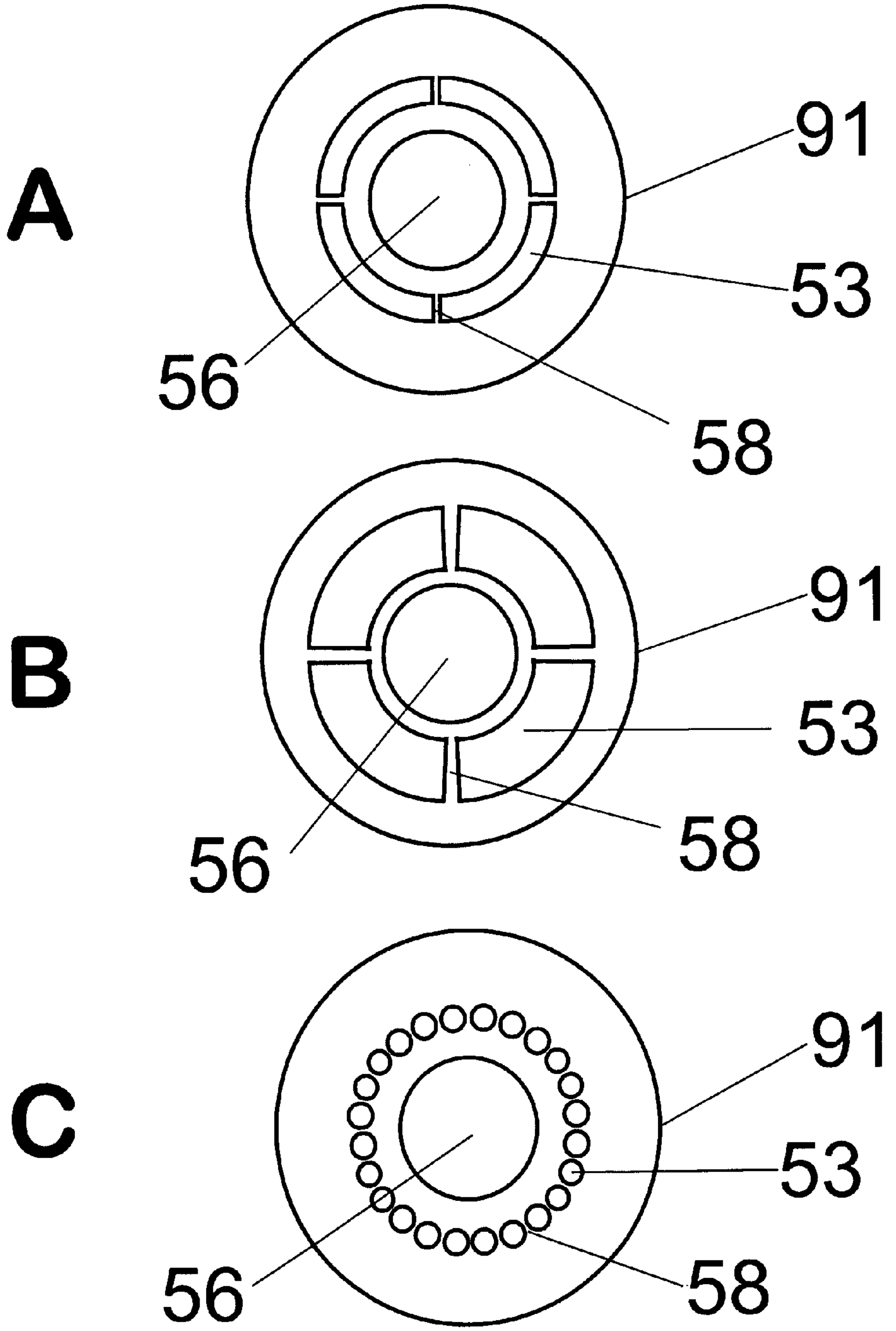
FIG. 12 shows alternative patterns in an annular laminated high-transmission element (L-HTE) with annular openings, (A) slotted annular openings with smaller opening dimension, (B) slotted annular openings with larger opening dimension, and (C) a pattern of circles at a fixed radius from the source axis.

FIG. 9*b* shows a cross-section of a non-conventional APCI source where reagent ions are generated in a separate reagent ion source 21 confined within the L-HTE and on axis with the incident sample spray. This embodiment utilizes a counterflow of reagent ions transported across the front axial tuning electrode 46, where in this embodiment the electrode is now a laminated grid, to efficiently intercept with sample to produce ion-molecule reaction products upstream of the L-HTE, the products expanding radially from the axis and transmitted through the annular opening 98 of the L-HTE 90. In this embodiment, the discharge electrode 27 is contained within the L-HTE. Reagent gas flow 106 is introduced into a reagent source 21 through tubular paths through the insulating laminates 92. The gases and voltages can be feed to the axis across bridges 58 (see FIG. 12).

FIGS. 2A, 2B, 3, 6A, AND 6B—ADDITIONAL EMBODIMENT

[Multiple Metal Laminates and Back-Well Atmospheric Matrix Assisted Laser Desorption/Ionization (AP-MALDI)]

Figure 2A:
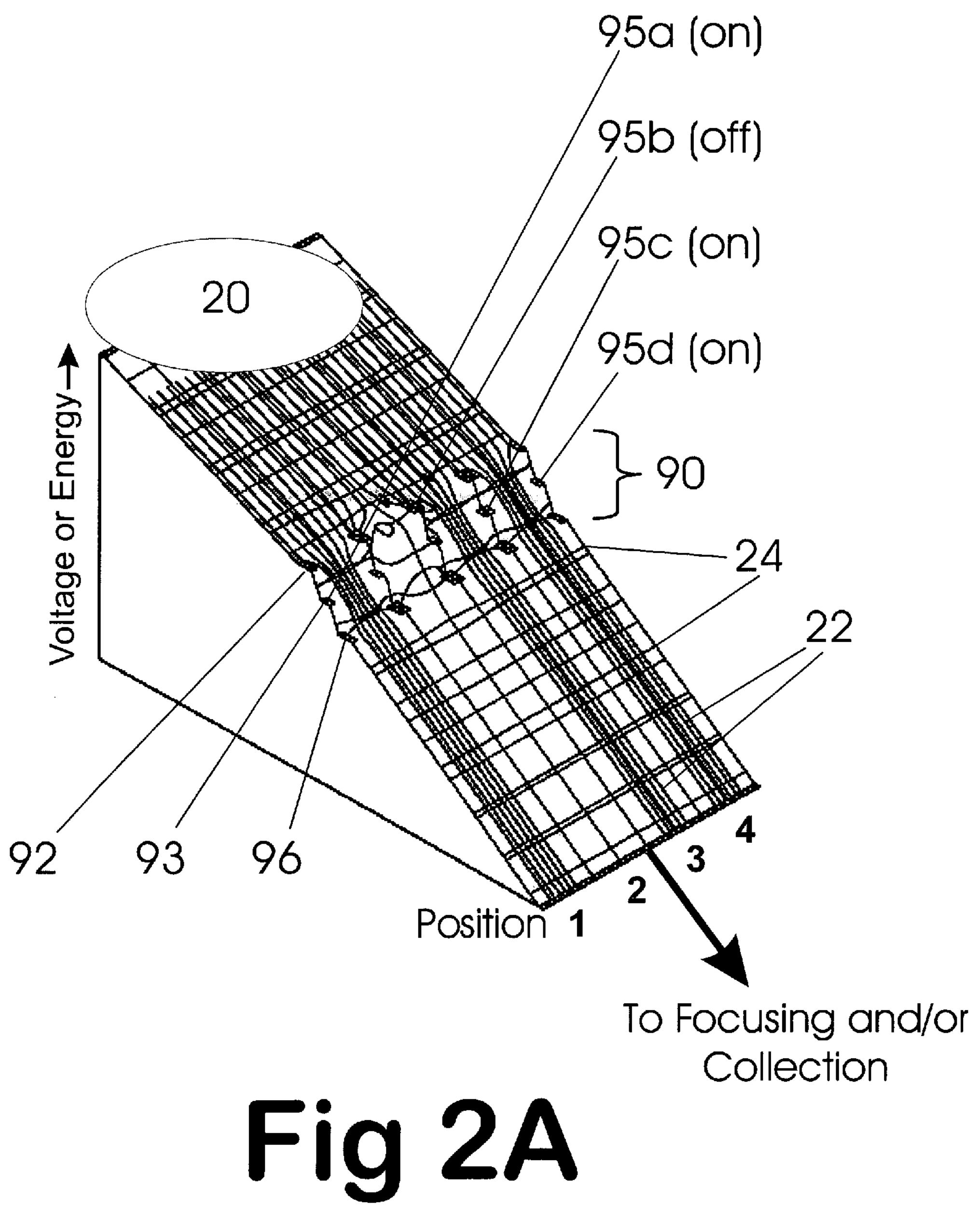
Figure 2B:
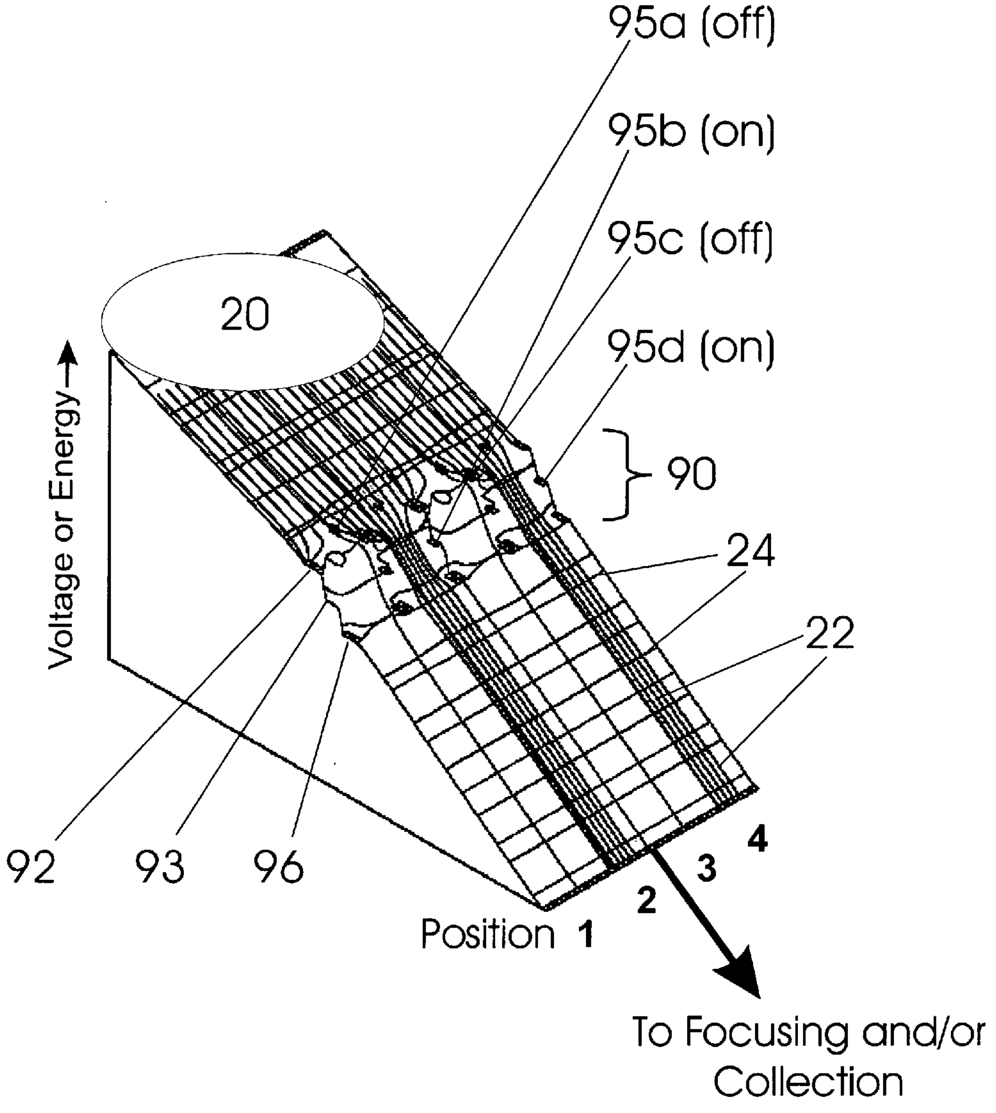
Figure 3:
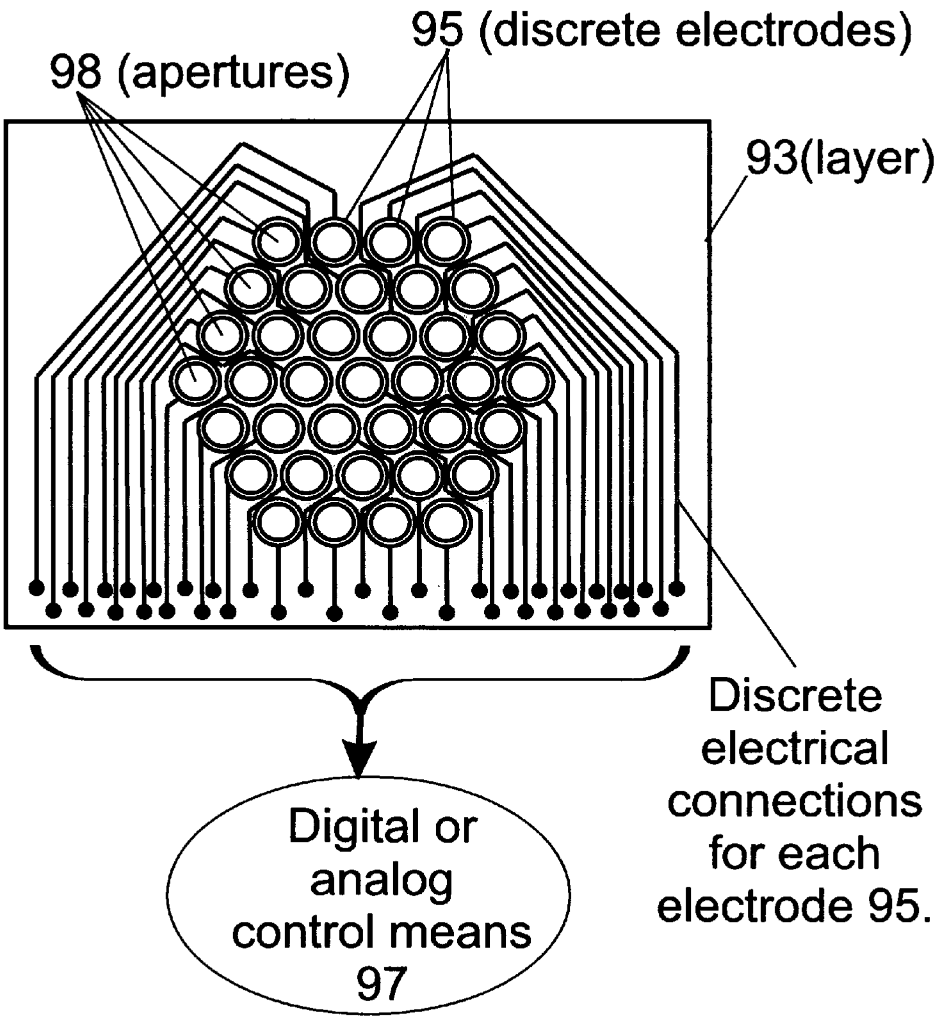

Additional embodiments are shown in FIGS. 2, 3, and 6, in one case the L-HTE consists of three metal laminates, and the other where a MALDI target is incorporated into the structure of the L-HTE. In FIGS. 2A, 2B, and 3 the L-HTE consists of three metal electrodes 91, with the interior laminate or electrode 93 or 91*b* sandwiched between electrodes 91_a_, and 91_c_. The internal electrode 93 is made up a multitude of individual electrodes, 95_a_, 95_b_, 95_c_, etc. isolated from each other and electrodes 91_a_, and 91_c_ by the insulating base 92. A digital or analog control means 97 controls the DC electric potential of the individual electrodes.

Figure 6A:
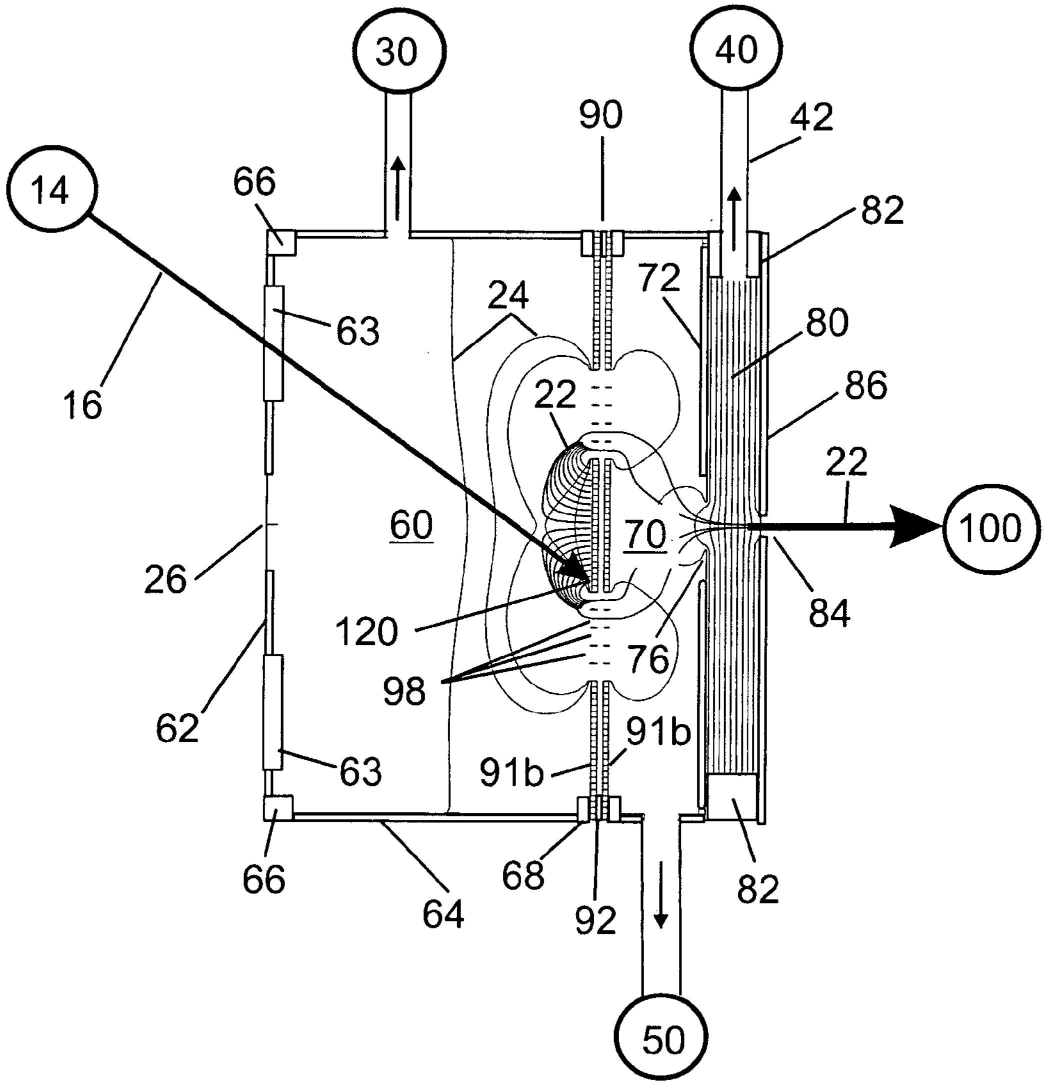
Figure 6B:
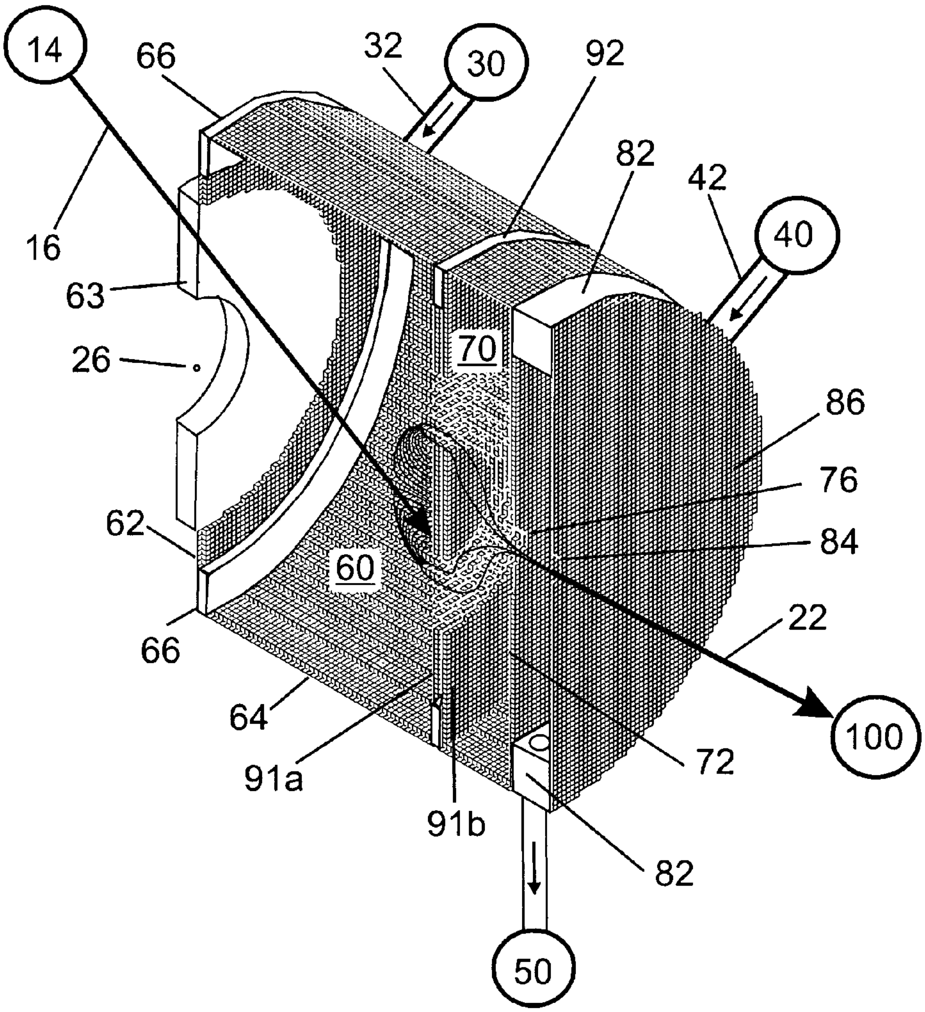

In FIGS. 6A and 6B the present invention incorporates a laser source 14 and the use of an incident laser beam 16 to desorb MALDI samples from a MALDI target disk 120 that is incorporated into the electrode 91_a_ of the L-HTE 90. Region 60 can be either open to the atmosphere or closed with access to the target 120 through a window 63. In this embodiment, a needle electrode 26, axial with the L-HTE 90, incorporated in the ion source entrance wall 62 or alternatively the wall can be completely eliminated leaving just the needle electrode projecting into the ion source region 60.

FIGS. 4, 7, 12, AND 13—ALTERNATIVE EMBODIMENTS

[Manufacturing, Shapes, and Patterns]

Figure 4:
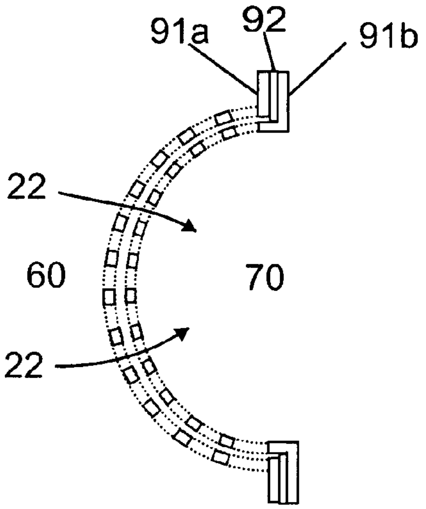
Figure 4:
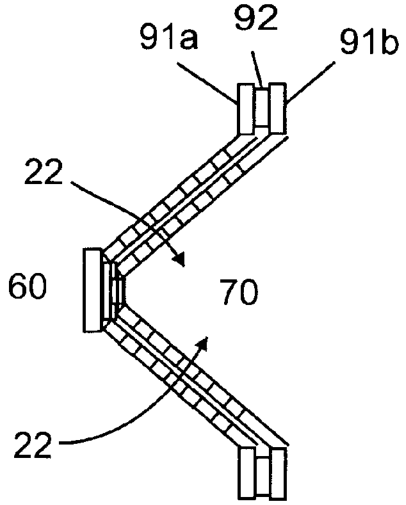
Figure 4:
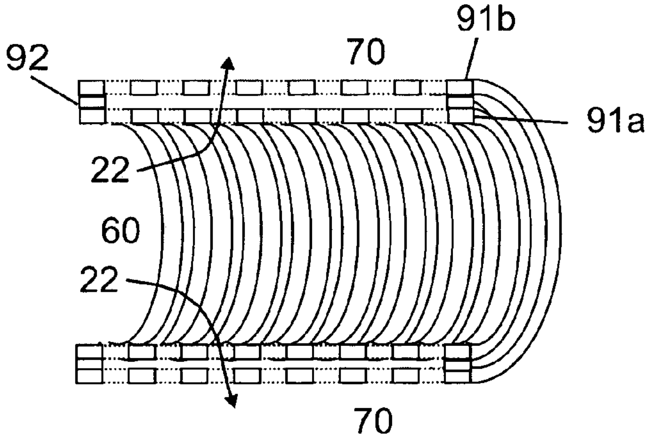
Figure 4:
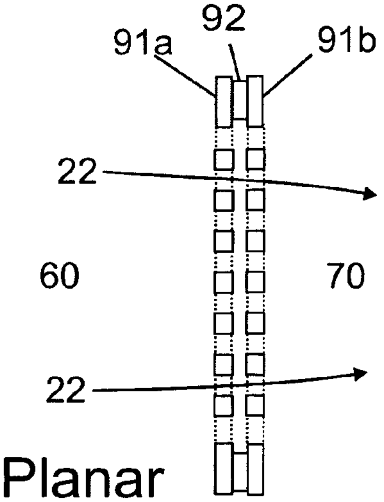

There are various possibilities with regard the geometry and shape of the laminated high-transmission element and disposition of the insulating layer, as illustrated in FIG. 4; in each case the insulation layer 92 is not continuous between the metal laminates. FIG. 4A shows a set of hemisphere-shaped electrodes 91_a_, and 91_b_; FIG. 4B shows a set of conical-shaped electrodes 91_a_, and 91_b_; FIG. 4C shows a set of tubular-shaped electrodes 91_a_, and 91_b_; FIG. 3D shows a set of planar-shaped electrodes 91_a_, and 91_b_; and a wide variety of geometries can be implements as geometric barriers between one or more regions and/or one or more ion destinations.

Alternatively, there are various possibilities with regard to the shape of the laminated openings, as illustrated in FIG. 7 for hemi-spherical-shaped L-HTE where the openings in one laminate are optically aligned with openings in the other, and uniformly spaced in order to meet the field penetration, transmission, and isolation requirements of a particular application. FIG. 7A shows a hemispherical-shaped L-HTE 90 made of perforated metal with circular-shaped openings 98; FIG. 7B shows a hemispherical-shaped L-HTE 90 made of woven metal with rectangular or square-shaped openings 98; FIG. 7C shows a hemispherical-shaped L-HTE 90 made of cross-hatched metal with rectangular or square-shaped openings 98; FIG. 7D shows a hemispherical-shaped L-HTE 90 made of hexagonal metal with hexagonal-shaped openings 98; FIG. 7E shows a hemispherical-shaped L-HTE 90 made of parallel array of wires with slotted or rectangular-shaped openings 98; FIG. 7F shows a hemispherical-shaped L-HTE 90 made of concentric metal hoops or rings with slotted or rectangular-shaped openings 98.

Figure 13:
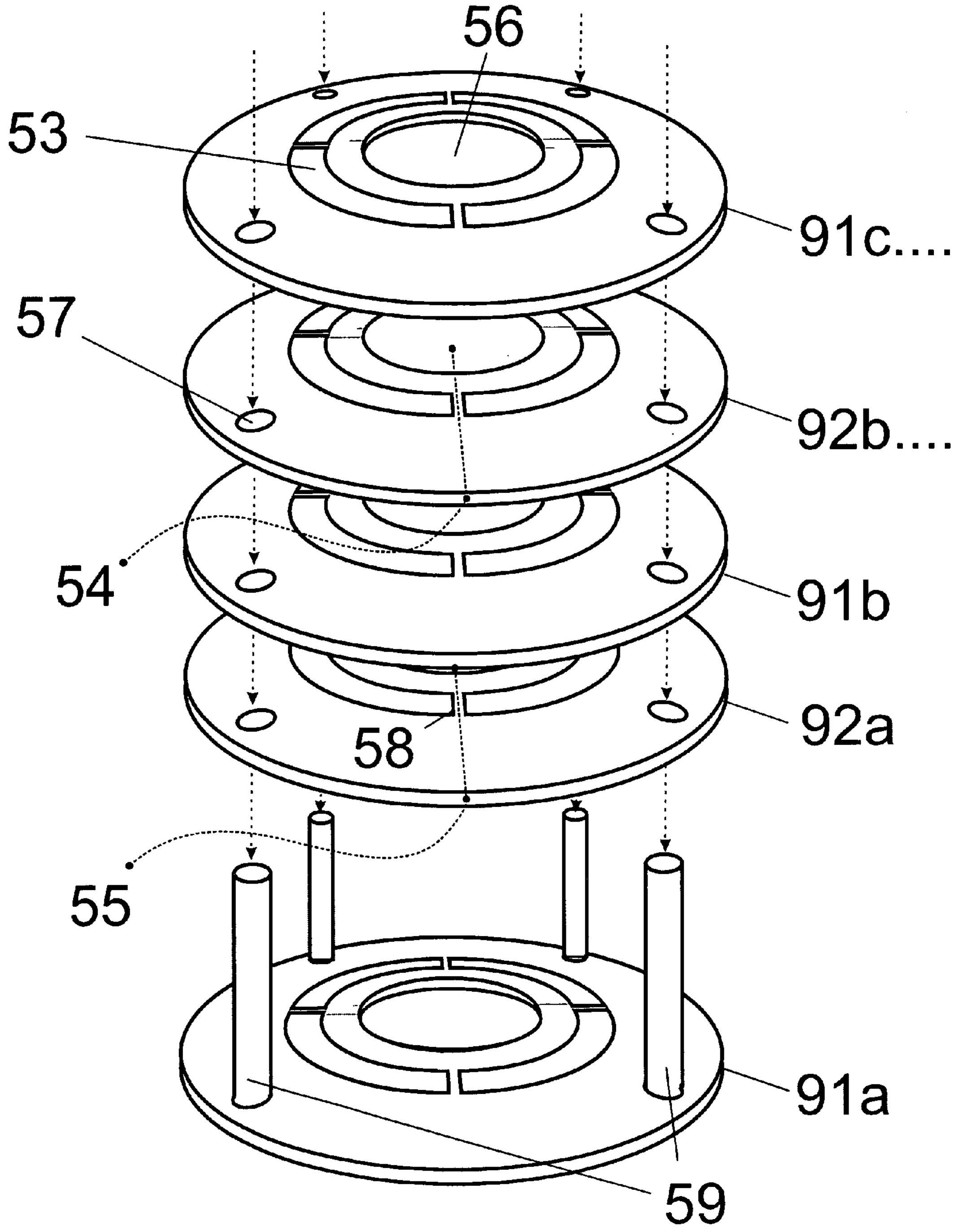
FIG. 13 shows one alternative for assembling the L-HTE. Note voltage and gas feedthroughs to the center axis region of the L-HTE are directed through the bridge regions across the annular openings.

FIGS. 12A–C illustrate three alternatives for implementing the annular opening pattern on the L-HTE. Any number of combinations of annular opening 53 and annular opening bridges 58 is possible to facilitate the effective field ratio across the laminates and the efficient collection of axial ions from the ion source. The axial tuning electrode opening 56 will be governed by the size of the tuning or central electrodes 44, 45 and the size of the source. More dispersive sources may require larger central electrodes 44, 45. FIG. 13 shows one alternative for assembly of the L-HTE stack, where the individual laminates are comprised of alignment post openings 57 and alignment post 59 to aid in the assembly of L-HTE; and feedthroughs for electrical 54 and gas connections 55. We also envision lamination and vapor deposition techniques used in semiconductor and integrated circuit board manufacturing may be useful for fabricating some implementations of L-HTE.

FIGS. 15 AND, 16 A THRU 16C—ALTERNATIVE EMBODIMENTS

[Improved Selectivity with an RF Component]

One additional embodiment of the present invention allows for selective transmission of ion through the L-HTE. FIG. 15 illustrates a version of the L-HTE with a layer in the laminate comprised of an outer 110 and an inner 112 RF laminates. These tubular devices are electrically isolated from one another and from the adjacent laminate electrodes by insulating laminates. An oscillating voltage waveform is applied to the inner 112 and outer 110 laminates in order to create a high pass or a band pass filter for transmission of ions through the L-HTE. Concurrent gas flow 103 is introduced to facilitate movement of ions through the interstitial space 114 between the inner 112 and outer 110 laminates. The RF laminates can be operated with symmetrical waveforms as shown in FIG. 16_a_ or asymmetric waveforms as in FAIMS. The device can also be scanned in frequency, amplitude, or combination thereof.

Operation of the Basic Device—FIGS. 1, 5, 8, 9, 10, and 11

Figure 1A:
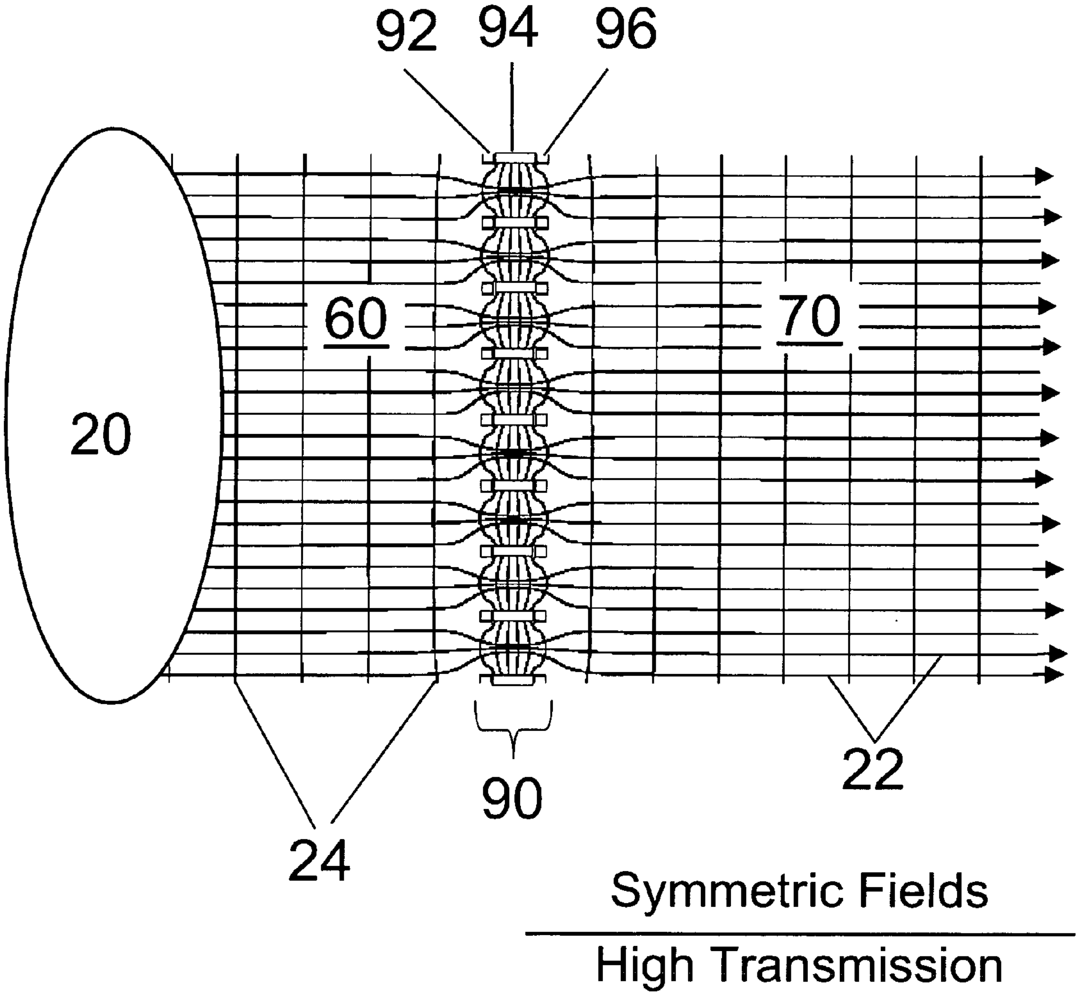
Figure 1B:
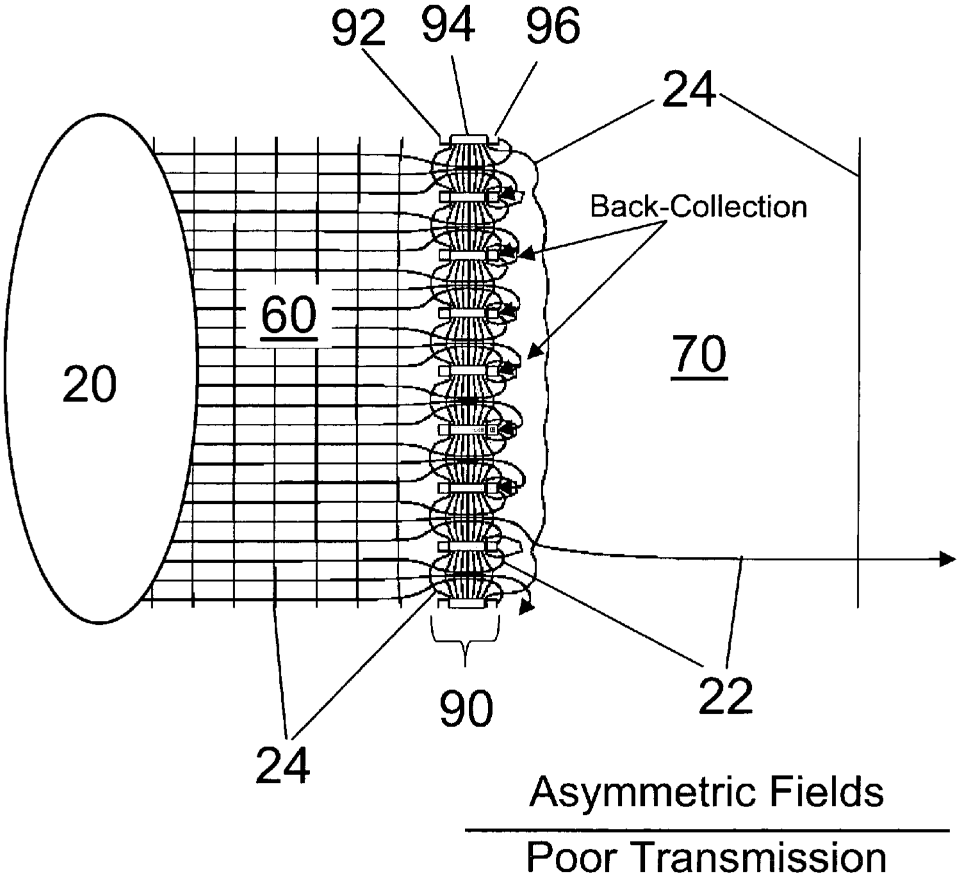
Figure 1C:
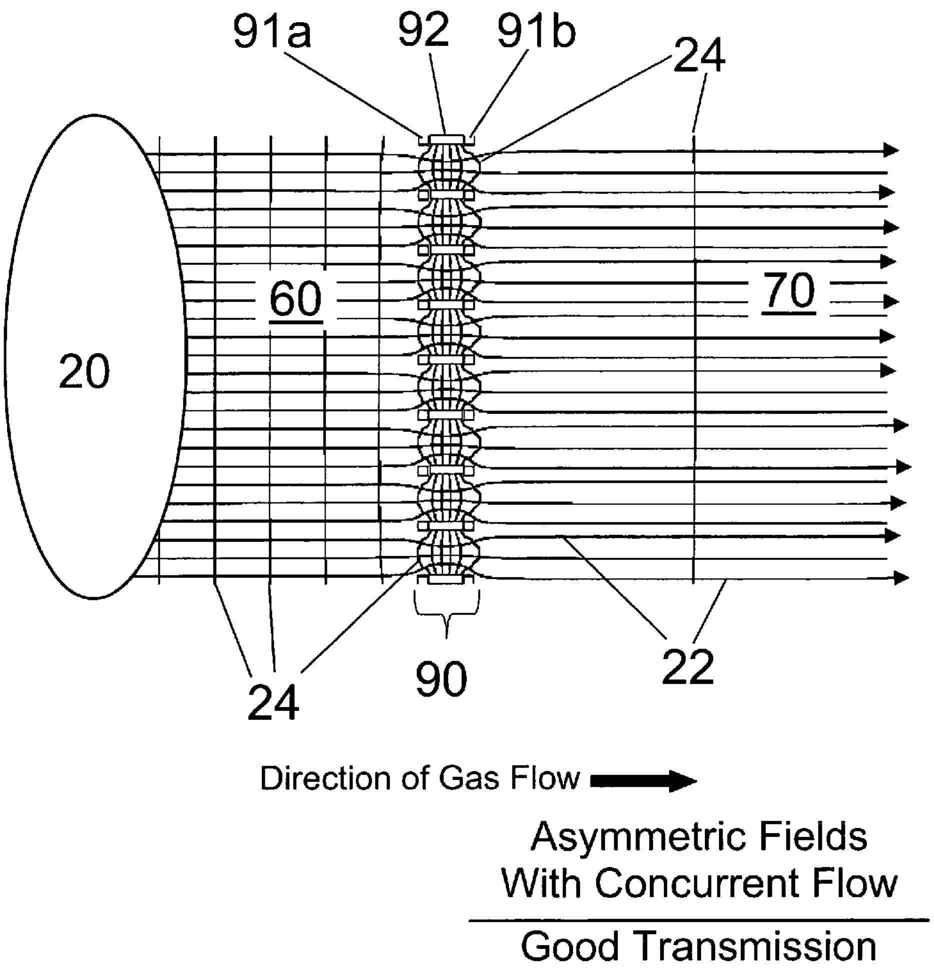

The L-HTE 90 in operation is placed between the ion source and the ion destination to isolate the processes of ion generation from ion collection, analysis, and detection without significant transmission losses. The potentials of the electrodes 44, 45 are adjusted to control transmission. Ions supplied or generated from an atmospheric pressure source are attracted to the L-HTE 90 by an electrical potential difference between the ion source region 20 and the potential on electrodes 91, 44 of the L-HTE 90. The ions will tend to follow the field lines through region 60. We distinguish regions 20 and 60 in that the ion source region 20 may comprise a plasma with ill-defined or uncontrollable fields. Region 60 contains gas such as air or nitrogen below the threshold for discharge ionization and fields defined by the shape and electric potentials on L-HTE 90. The ions moving toward the L-HTE are diverted away from the metal laminates on the outer surface 91_a_, 44 through the openings 98 by the presence of the electrical field penetrating through the openings into the part of region 60 that is close to the outer or upstream surface of the L-HTE. This field penetration is due to the potential difference between the upstream and downstream metal laminates being relatively high. As the ions move into the openings they are compressed toward the axis of openings 98. FIG. 1A illustrates the motion of ions through the L-HTE 90 when the fields on either side of the L-HTE are equal and transmission is virtually 100%. When the field on the ion source region 60 side is substantially higher than the field in the ion funnel region 70 side, many ions impact on the surface of the outer-electrode 91_b_ (back-deposition) as shown in FIG. 1B. To overcome transmission losses due to this unfavorable field ratio, a concurrent flow of gas can be added to prevent back-deposition (as shown in FIG. 1C) and thus maximize transmission of ions through the L-HTE into the ion funnel region 70.

Figure 5A:
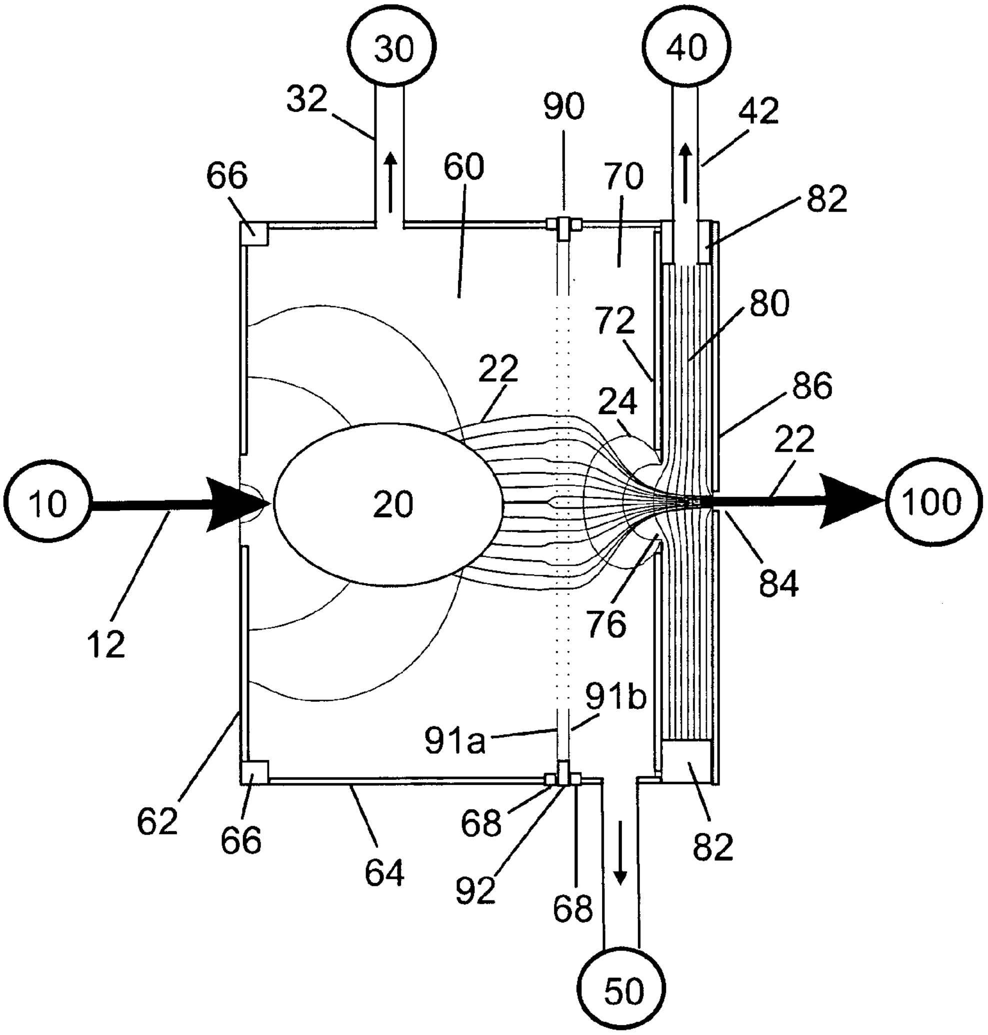
Figure 5B:
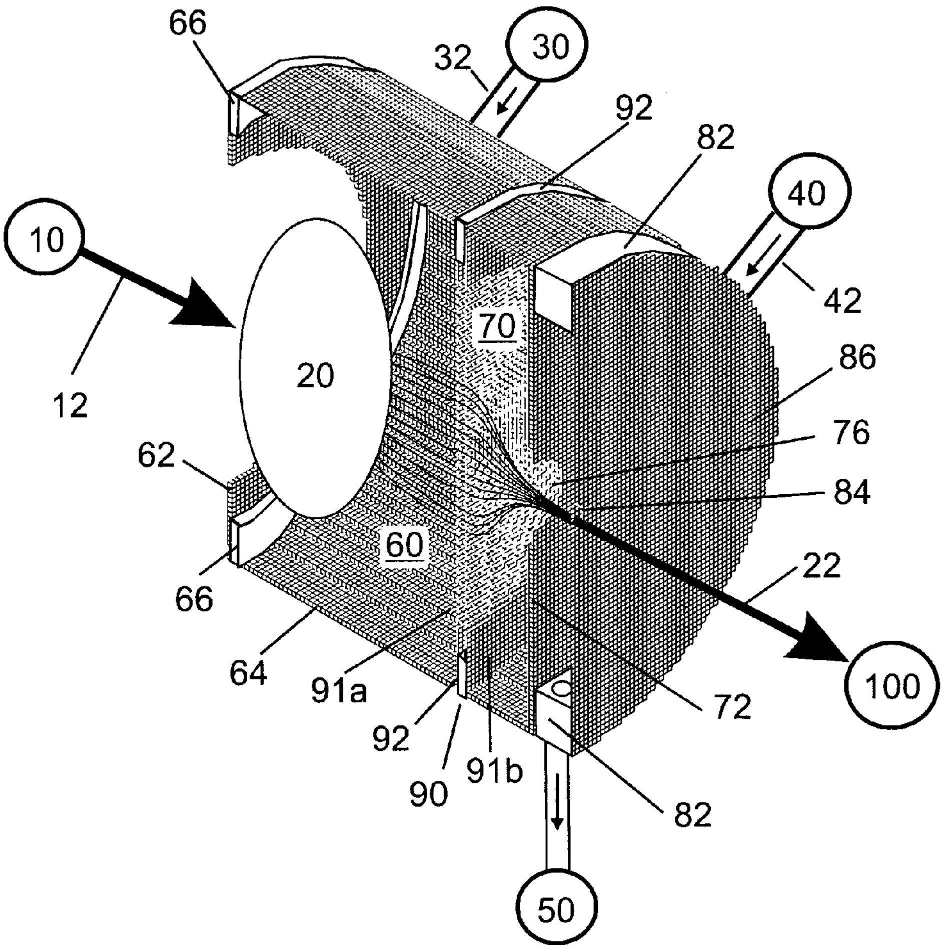
Figure 5C:
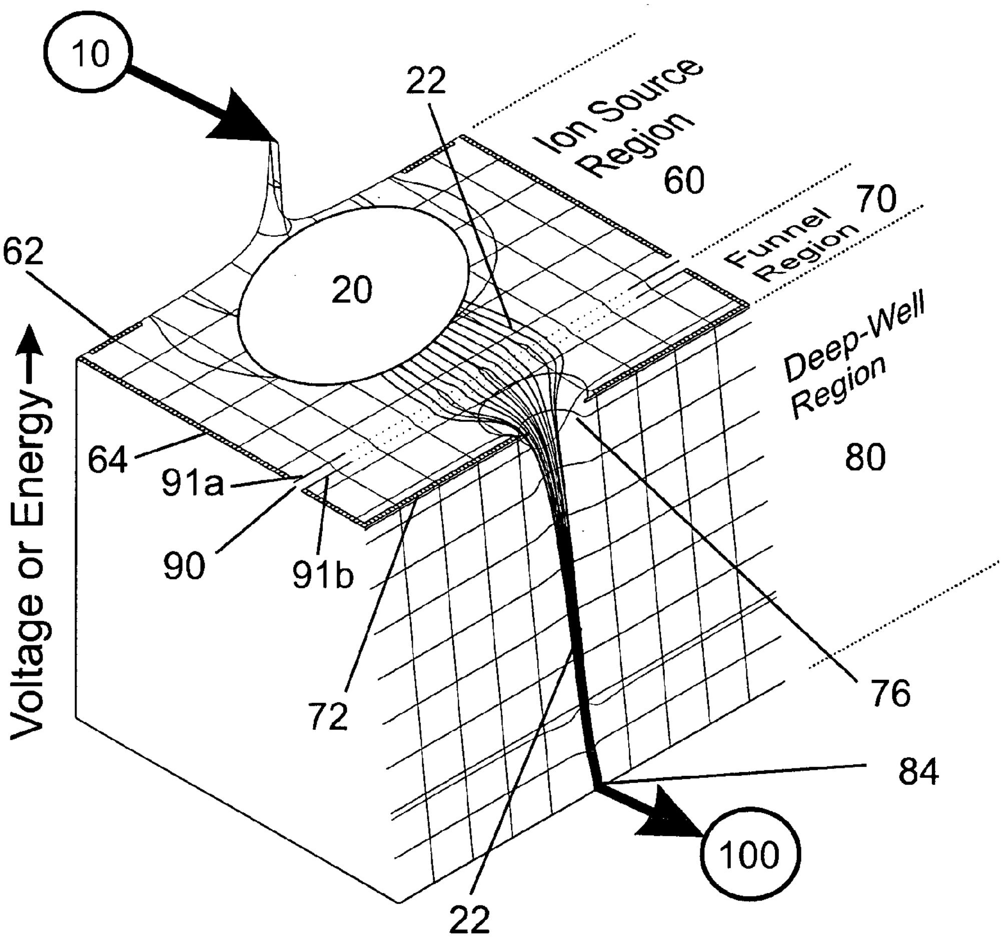

The device illustrated in FIGS. 5A and 5B operates by generating ions or collecting ions in the ion source region 60. The ions are accelerated away from the ion source region, toward and through the L-HTE 90 into the funnel region 70 of the device where ions are focused through the funnel aperture into the deep-well region where a wellcollimated and highly compressed beam of ions is delivered to the ion destination region 100. FIG. 5C displays the potential-energy surface plot showing the relative potential of each component of the operating system. In general, the ions flow form a dispersive, high-field source region, across the L-HTE 90 with local high-fields to nudge the ion through the openings 98 and through the L-HTE, into and through the funnel-shaped focusing fields of the funnel region 70, and into the deep potential well of the deep-well region 80. The general operation is simply to isolate the focusing regions 70, 80 from the dispersive ion source region 60 in order to maximize compression and collection while minimizing transmission losses.

The ion destination region 100 can be a mass spectrometer, MS/MS, IMS, and any other ion or charged particle detection and analysis device. Alternatively, this device may be operated as a collection and focusing device to move gas-phase ions and charged particulate materials from diffuse atmospheric sources onto small focal areas of collector surfaces. We envision applications for laying down materials in printing, semiconductor, micro-chemistry applications, etc. In addition, this device can operate to collect sample onto surfaces for subsequent surface analysis (e.g. depositing sample onto MALDI targets, SIMS targets, or X-ray targets). In addition, collecting material onto surfaces of reaction wells may allow for gas-phase ion production to be a useful tool for placing charge chemical species into a discrete and small reaction well in applications, such as but not exclusively for, collecting and specifying complex reagents and reactant for applications in combinatorial chemistry.

The flow of gas in a direction that is counter to the movement of ions will serve to reduce or eliminate contamination from particulate materials and neutral gases. Operating with a counter-flow of gas is accomplished by adding sufficient flow to purge or remove unwanted materials. This to some extent will have some dependency on the volatility of neutral gases and the size of interfering particulate material originating from the ion source region 60. Lower mobility charged particles may also be swept away in the counter-flow of gas. In some cases, a combination of gas flowing concurrent to the motion of ions to improve transmission through the L-HTE and gas flowing counter-current to remove impurities may be required. When using gas flowing in opposite directions the counter-flow of gas is likely to originate downstream of the L-HTE, flowing through the funnel aperture 76.

The annular devices shown in FIGS. 8, 9, 10, and 11 create a donut or annular shaped distribution of ions as they traverse the L-HTE. Spray sources such as electrospray and APCI impart significant momentum to the spray on axis, making on axis sampling difficult and laden with particles. Higher mobility ions easily migrate to the radius of the annulus under the influence of radially dispersive electric fields. At the same time, the ions are compressed into a tight ring, which can be transmitted through the annular opening. A single annular opening is a efficient way to collect ions and exclude particles, while an array of expanding concentric annular openings may be used for ion sources with dispersive plasma of ions or situations where ions are delivered to multiple destinations.

FIG. 14A shows a simple two-layer annular-shaped L-HTE with front and back tuning electrodes. A dielectric material may be substituted for a pure insulator if a thick laminate layer 92 is desired. This may reduce charge of the surface.

FIG. 14B shows a five-layer L-HTE with axial countercurrent gas 104 directed through the tuning electrode 44 into the region upstream of the L-HTE. On-axis heated drying gas can be added to aerosols of charged droplets, such as, electrospray to facilitate evaporation and desorption of ions. In addition, a flow of concurrent gas 103 may be added on-axis to the downstream side of the L-HTE. The gas will facilitate ions and charged particles to be directed towards the downstream side of the second saddle-shaped field 4.

FIG. 14C illustrated the use of concurrent focusing gas flow 102 and countercurrent gas flow 103 within the annular opening has the benefit of aerodynamic focusing and complete isolation of the upstream and downstream gas composition. Only ions will be able to traverse the L-HTE. This approach is also an effective method for removal of larger particles and contaminates that will over time tend to accumulate in the openings, in the ion destination region of the vacuum chamber, or both.

Operation of Multiple Source Devices

The operation of the present invention can accommodate the collection of ions from more than one source. This multi-source device operates under the same principles as a single-source device but the ion source region 60 is occupied by more than one ion source. This can have application for devices with both APCI and electrospray ion sources present in the same ion source region either spraying simultaneously or alternating back and forward in a pre-determined manner. In addition, electrospray needle arrays are also becoming commercially available for high-throughput sample analysis, discrete introduction of mass calibration standards, etc.; sampling the spray from the electrospray needle array one needle at a time. Alternatively, a laser can desorb a series of samples from individual targets one target at a time. Operation with more than one source can also occur with selective sampling of ions from a desired source through one region of the L-HTE while rejection ions from another source in a second region of the same L-HTE. Thereby operating the L-HTE as an ion switch, selecting one sample stream then another.

Operation of Multiple Collector or Target Devices

This invention may also operate in a mode whereby the ions from a single ion source region 60 are collected and focused across multiple or arrays of L-HTE with multiple discrete collection regions. This mode is useful for delivering ions from a single source to multiple focal points or apertures for sampling and eventual analysis or delivering to multiple targets. A single ion source with two or more L-HTE and companion targets up to a large array of L-HTE and target foci can have application in a wide variety of areas including loading reagents onto reaction wells, printing, micro-fabrication, semi-conductor manufacturing, etc.

Operation of Spacially Selective Transmitting Device—FIGS. 2 and 3

The L-HTE can be used to selectively transmit ions through pre-selected openings by incorporating a third metal laminate. As shown in FIGS. 2A, 2B, and 3 when an additional metal laminate is added to the L-HTE, the transmission of ions can be selectively blocked or transmitted across the L-HTE. The inner- and outer-electrodes 91*a*, 91*c* serve in much the same way as the two-layer laminate. This embodiment has an interior electrode 93, 91*b* comprised of a large number of individually isolated aperture electrodes (represented as 95*a* through 95*d* for aperture position 1 through 4 respectively) that can be individually controlled in time and electrical potential. These electrodes provide a means to produce a potential barrier at each discrete opening in the L-HTE surface. Each discrete opening electrode 95 has an electrical connection to the external control means 97. These electrodes can be controlled both individually and in groups or clusters depending on the application and the spatial resolution requirement for transmission of the intended application. This control can be either analog or digital, utilizing digital control for high-speed control applications. Thereby allowing for the transmission of ions to be temporally and spatially controlled over the surface of the L-HTE. This more complex embodiment has application in delivering ions from a source to a precisely determined spatial position, for example the L-HTE can be used for laying down samples onto MALDI targets or laying down reagents into microchip arrays. Alternatively, it can be used for laying down complex patterns for very precise micro-printing, coating applications, etc. It should also be noted that the pattern of ions generated by this gating process can be subsequently focused and compressed by various optical configurations.

Operation of An atmospheric MALDI (AP-MALDI) Device—FIG. 6

Figure 6C:
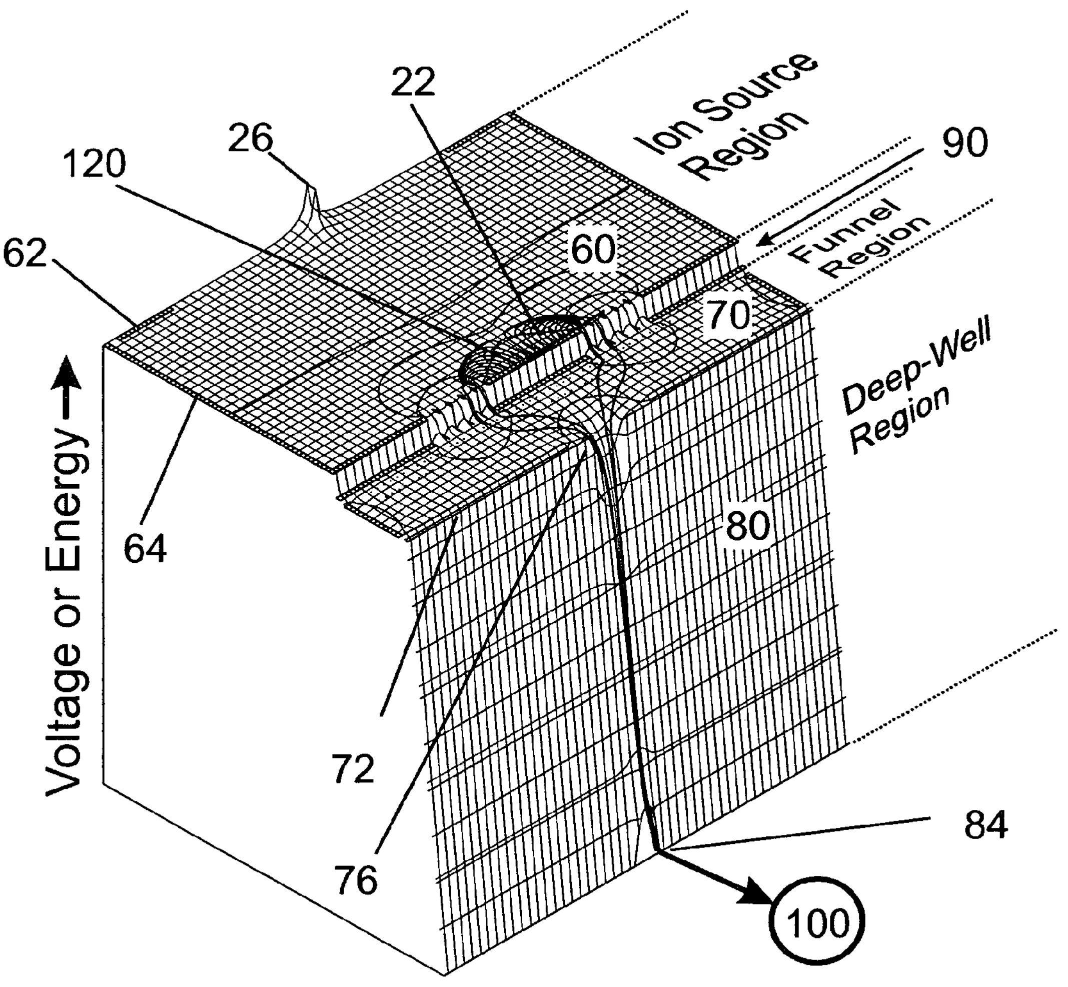
Figure 7A:
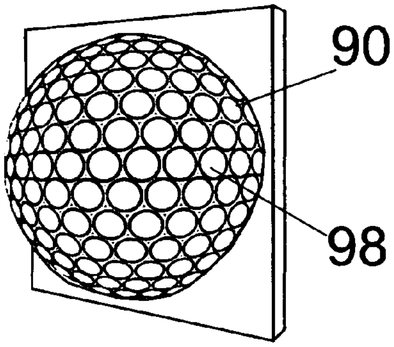
Figure 7B:
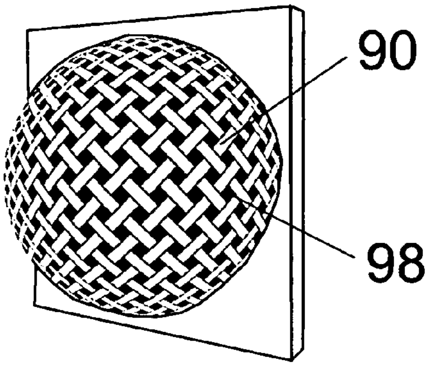
Figure 7C:
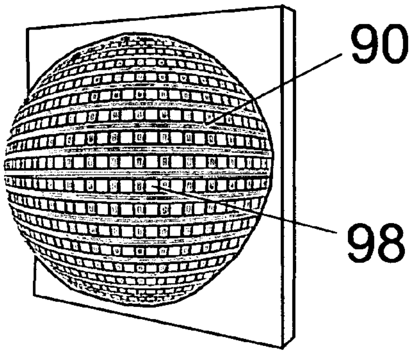
Figure 7D:
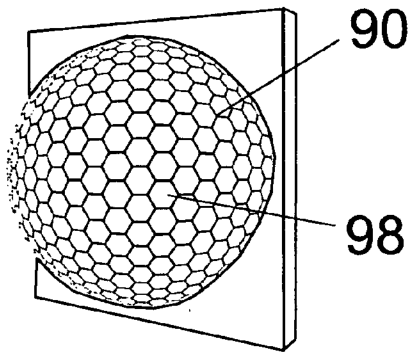
Figure 7E:
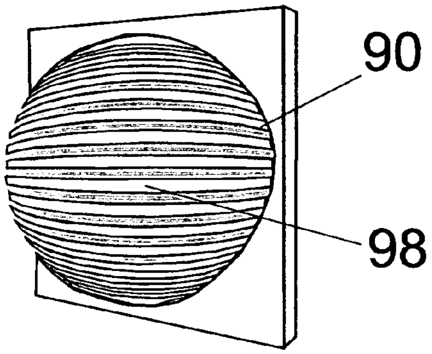
Figure 7F:
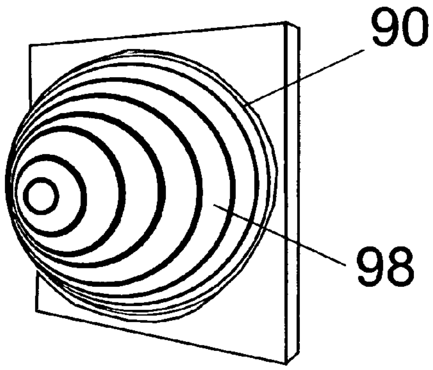
Figure 8A:
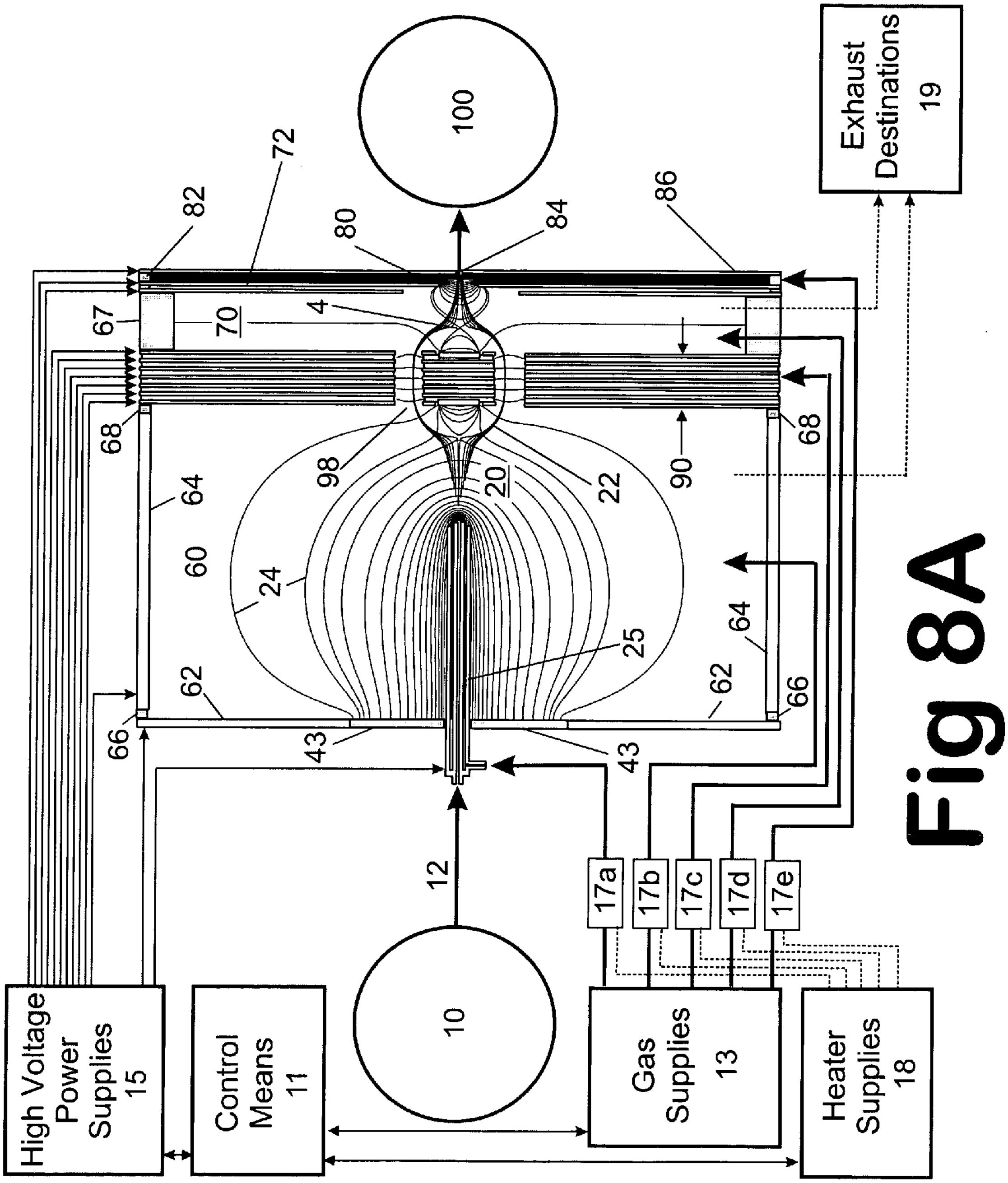
Figure 8B:
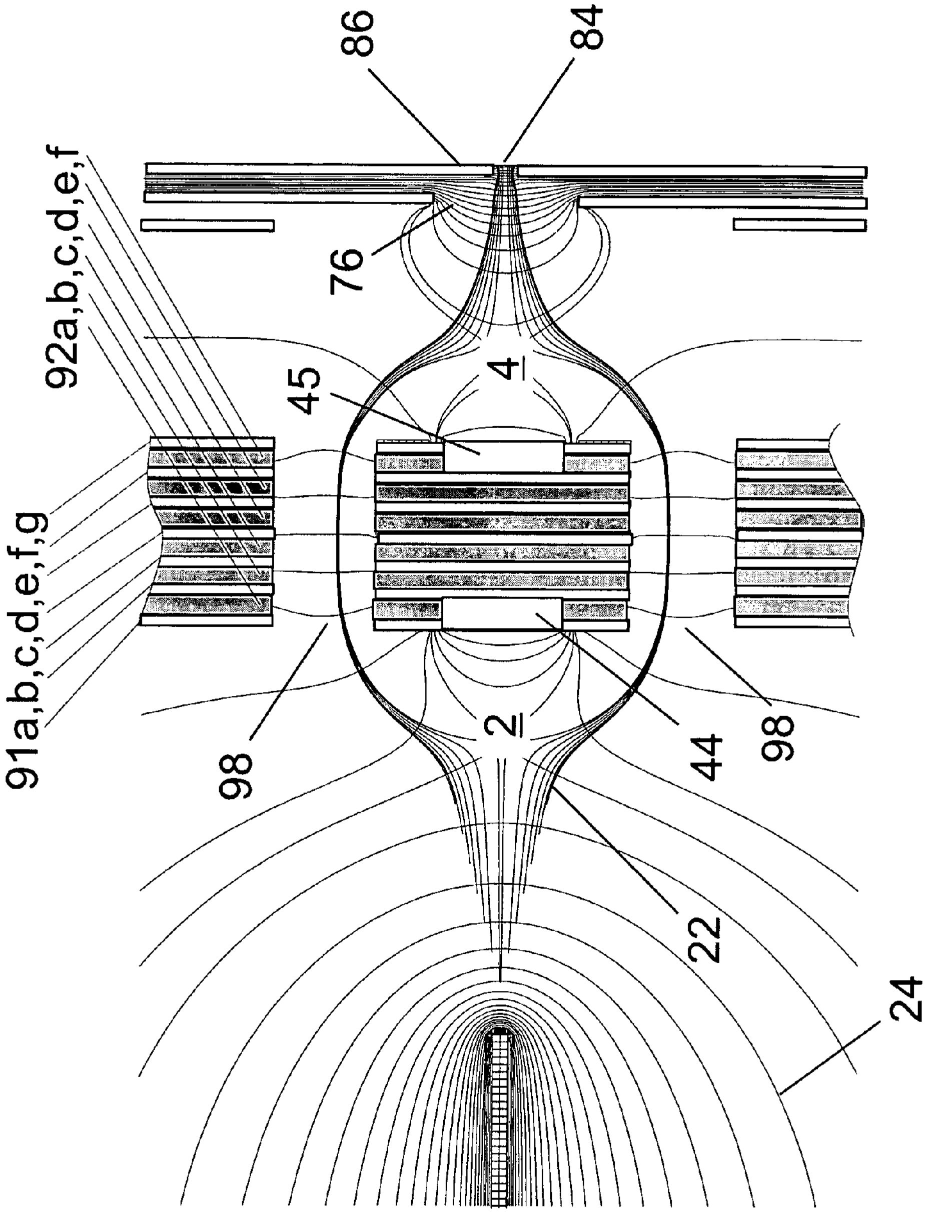
Figure 8C:
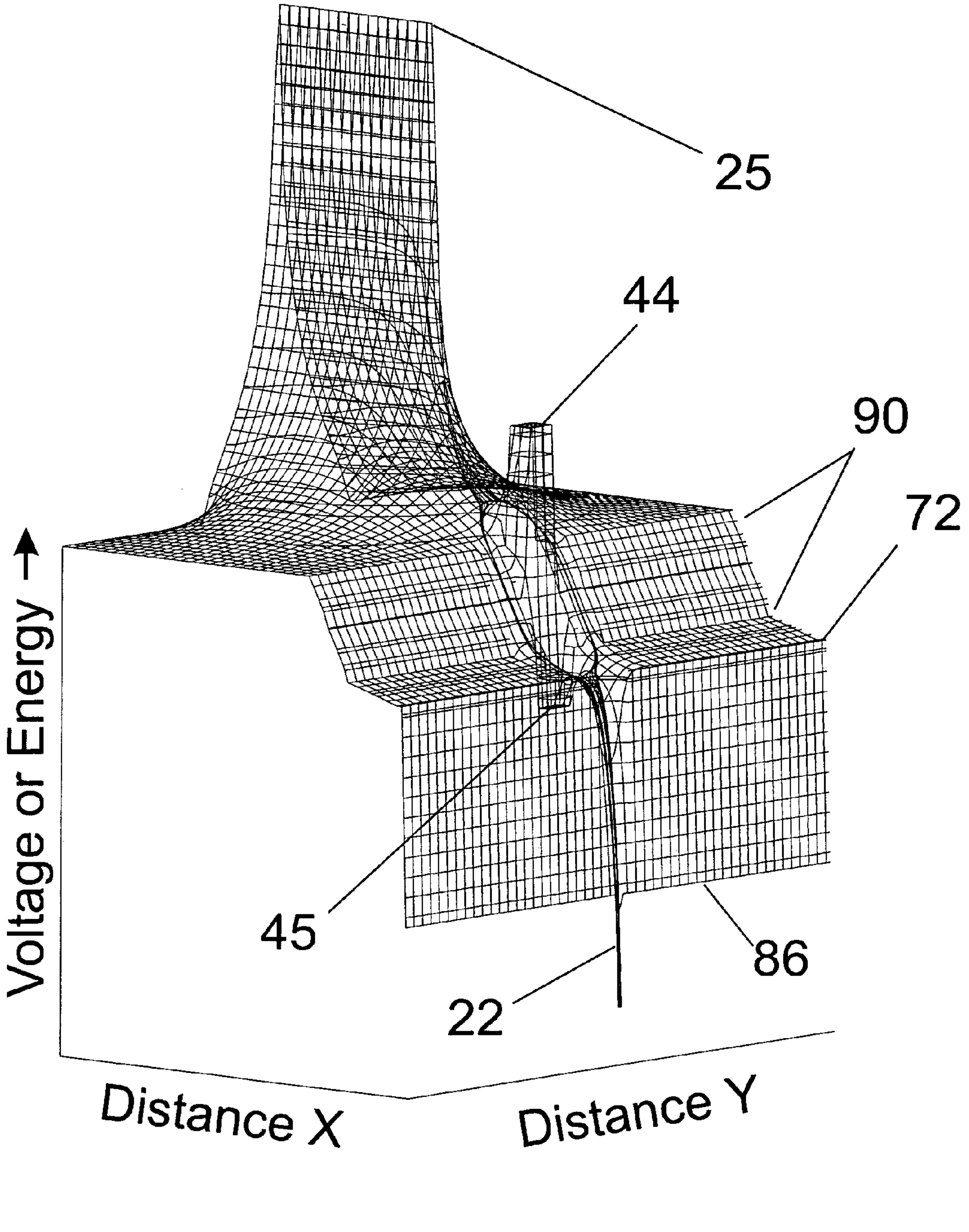

The operation of the atmospheric pressure-MALDI (AP-MALDI) source illustrated in FIGS. 6A and 6B is fundamentally the same as the general operation with several important exceptions. FIGS. 6A and 6B illustrate two views of an AP-MALDI source with the MALDI samples directly deposited on the surface of the outer-electrode. Samples can be applied directly to the surface, or, more conveniently onto the conducting sample disk 120 that attaches co-planar and makes electrical contact to the outer-electrode. In this fashion, MALDI samples are desorbed from the surface by illuminating the surface with the laser beam 16 from the laser source 14. Once desorbed, the ions proceed on trajectories that wrap around the sample plane, traversing the L-HTE 90; and are focused and compressed in a similar fashion as described in the preferred embodiment. In this embodiment, a ring of slotted openings (laminated openings 98) around the target area provides the necessary field penetration for accelerating the ions away from the target and subsequent transmission through the openings. The optional needle electrode 26 in region 60, on axis with the MALDI target can be operated to control the degree of field penetration from the L-HTE into region 60. FIG. 6C shows a close-up of the potential-energy surface on this device illustrating the position of the deep-well downstream of the sample, thus designating this embodiment as "back-well" AP-MALDI.

Operation of the RF Device (Chemically Selective)—FIGS. 15 and 16A thru 16C The operation of the RF device prefers that the L-HTE operate with the annular opening so that ions from a dispersive source are collected in a an annular cross-section through the L-HTE. An oscillating voltage is applied to both the outer and inner RF laminates 110, 112 to minimize dispersion of ions as they traverse L-HTE. The typical field driven motion through the L-HTE is replaced by concurrent gas flow in the direction of the destination region. In the space 114, between 112 and 100, ions will move with the oscillation of the inner 110 and outer 112 electrodes. In the case of symmetric RF, ions with high mobility (e.g. low mass) will be lost to the walls. This mode of operation is an effective high pass filter and may be effective at removing excess reagent ions from generated in atmospheric pressure chemical ionization sources and other ion rich plasmas that may contribute to space-charge losses downstream at the conductance openings at the high pressure-vacuum interface. In the case of asymmetric RF, ions can migrate due to differential ion mobility and a selective band of mobilities may be obtained. Note also, that the counter flow gas 102 can be effective for removing large particles and droplets at the entrance to the L-HTE.

CONCLUSION, RAMIFICATIONS, AND SCOPE

Although the description above contains many specifications, these should not be construed as limiting the scope of the invention but as merely providing illustrations of some of the presently preferred embodiments of this invention. For example, complex shapes and patterns can be deposited by tailoring the shape of the L-HTE or the shape, pattern, or spatial orientation of the individual openings in the separate metal laminates; insulator surfaces can be manufactured by using the techniques of microelectronics fabrication; photolithography for creating patterns, etching for removing material, and deposition for coating the base with specific materials; the number of laminates and the size and shape of the individual openings can vary depending on the source of ions, the extent of using concurrent and countercurrent gas flow, the type of ion-collection region or a combination of both, etc.

Thus the scope of the invention should be determined by the appended claims and their legal equivalents, rather than by the examples given.

We claim:

1. Apparatus for the collection and focusing of gas-phase ions, charged particles, changed droplets, or combination thereof, at or near atmospheric pressure, the apparatus comprising:

a. a dispersive source of ions;

b. a lens populated with a plurality of openings through which said ions pass unobstructed into a focusing region, said lens having a topside and an underside, said lens comprised of alternating layers of insulting and metal laminates with a metal laminate on said topside and said underside of said lens that are contiguous with said insulating laminate, said metal laminate on said topside of said lens is adjacent to said ion source, said metal laminates being supplied with attracting electric potentials by connection to a voltage supply, and generating an electrostatic field between said source of ions and said metal laminates;

c. a target surface, downstream of said lens for receiving said ions, said target surface held at a higher strength electrostatic direct current potential by connection to said voltage supply, and generating an electrostatic field between said metal laminates of said lens and said target surface, which has field lines that are concentrated on a relatively small cross-sectional area of said target surface;

d. a funnel lens or electrode sandwiched between said lens and said target surface for focusing said ions exiting into said focusing region through said openings in said lens into a deep-well region interposed between said funnel lens and said target, said funnel lens held at an electrostatic direct current potential, whereby electrostatic field lines are focused through a central opening in said funnel electrode and towards a small cross-sectional area on said target surface, thereby focusing approximately all said ions onto said small cross-sectional area;

e. a first means for supplying a gas supply in such a way into said ion source region, whereby substantially all said gas flows into said ion source;

f. a second means for supplying a gas supplied in such a way into said deep-well region between said target surface and said funnel electrode, into said focusing region, or a combination thereof, whereby substantially all said gas flows into said focusing region;

g. a third means for supplying a gas supplied in such a way to said laminated lens, whereby substantially all said gas flows into said plurality of openings, through openings in metal laminates on topside or bottom side of said lens, or a combination thereof, said gas flowing out into ion source and ion focusing regions; and h. a gas exhaust means for evacuating said gases in said focusing region and said ions source, whereby at least some of said gas flows into said gas exhaust;

whereby, substantially all said gas-phase ions, charged particles, charged dropets, or combination thereof are transferred through said lens and onto or at said target surface.

2. The apparatus in claim 1 wherein said plurality of openings in said lens are oriented equal distance from a central axis, whereby said plurality of openings form an angular, toroidal or doughnut shaped opening through said lens.

3. The apparatus in claim 1 wherein said lens is comprised of at least two metal laminates with one said insulating laminate separating said metal laminates.

4. The apparatus in claim 1 wherein said insulating laminates are comprised of a dielectric material or composite.

5. The apparatus in claim 1 wherein said plurality of openings in said lens further include at less two openings.

6. The apparatus as in claim 1 wherein said gas-phase ions are formed by means of atmospheric or near atmospheric ionization.

7. The apparatus as in claim 1 further including a downstream and an upstream electrode, said downstream electrode incorporated in said underside of said lens, said upstream electrode incorporated in said topside of said lens, both electrodes are on-axis with said plurality of openings and said plurality of openings are disposed concentrically around said electrodes, both electrodes being supplied with an electrostatic potential whereby said downstream electrode shapes the electric field lines in the area downstream of said bottom side of said lens and said upstream electrode shapes the electric field lines in the area upstream of said topside of said lens, respectively.

8. The apparatus as in claim 1 wherein said lens further includes a central electrode, wherein said central electrode is disposed on-axis with said openings and said openings are disposed concentrically surrounding said central electrode, said central electrode is supplied with electrostatic, electrodynamic potentials, or a combination thereof, whereby an electric potential well is formed down the axis of said openings.

9. The apparatus as in claim 1 wherein said lens further includes a gas discharge source supplied with a gas means, said gas discharge source is on-axis with and sandwiched between said downstream and upstream electrodes, whereby said discharge source forms reagent gas-phase ions, said reagent gas-phase ions and any residual gases in said discharge source pass through openings in said upstream electrode into said ion source region reacting with said gas-phase ions in said ion source region forming product ions, substantially all ions, both reagent and product ions, pass into said plurality of openings in said lens.

10. The apparatus as in claim 1 wherein said atmospheric or near atmospheric ionization source is comprised of an electrospray, atmospheric pressure chemical ionization, atmospheric laser desorption, photoionization, discharge ionization, inductively coupled plasma ionization source, or combination thereof.

11. The apparatus as in claim 1 wherein said target surface for receiving said ions, has a target aperture, a series of openings, a conductive end of a capillary tube, or a combination thereof, whereby said electrostatic field lines are concentrated on a relatively small cross-sectional area of said target aperture or openings.

12. The apparatus as in claim 11 further including an analytical apparatus in communication with said target aperture or tube, wherein said target aperture or tube is interposed between said funnel electrode and said analytical apparatus, said small cross-sectional area of ions being directed through said target aperture or said opening of said target tube into said analytical apparatus.

13. The apparatus as in claim 12 wherein said analytical apparatus comprises a mass spectrometer or an ion mobility spectrometer or a combination thereof.

14. Apparatus for the collection and focusing of an aerosol of gas-phase charged particles or droplets from an atmospheric or near atmospheric pressure ion source, the apparatus comprising:

a. a dispersive source of said charged particles or droplets;

b. a laminated lens populated with a plurality of openings, said openings are oriented equal distance from a central axis forming an angular or toroidal shaped opening through which said aerosol of charged particles pass unobstructed into a focusing region, said lens having a topside and an underside, said lens consisting of a central electrode, said central electrode is laminated on both sides with alternating layers of insulating material and metal laminate, said insulating material is contiguous with said central electrode and said metal laminates, said metal laminate on the topside of said lens is downstream of said source, said central electrode is disposed on-axis with said plurality of openings and said plurality of openings are disposed concentrically surrounding said central electrode, said metal laminates on said topside and underside of said lens are supplied with attracting electric potentials, said metal laminates between said topside and underside metal laminates of said lens and central electrode are supplied with electrostatic, electrodynamic potentials, or combinations thereof, generating electric fields between said atmospheric ionization source and said lens;

c. a target surface downstream of said lens for receiving said charged particles, said target surface being supplied with an ion-attracting and higher strength electrostatic potential, generating an electric fields between said lens and said target surface whereby electric field lines are concentrated to a small cross-sectional area on said target surface;

d. an funnel lens or electrode disposed between said lens and said target surface for focusing said charged particles in said focusing region into a deep-well region, said funnel lens being supplied with an electrostatic direct current potential, whereby approximately all said charged particles in said focusing region are focused into said deep-well region and onto said target surface;

e. a first means of supplying a gas supplied in such a way into said deep-well region, whereby substantially all said gas flows into said focusing region;

f. a second means of supplying a gas supplied in such a way into said ion source region, whereby substantially all said gas flows into said ion source;

g. a gas exhaust for evacuating said gases in said focusing region, whereby at least some of said gas flows into said gas exhaust.

15. The apparatus of claim 14, further comprised of a means for supplying a gas supplied in such a way to said laminated lens, whereby substantially all said gas flows into said plurality of openings flowing either upstream out into said ion source, downstream into said ion focusing regions, or a combination thereof.

16. The apparatus of claim 14, wherein said atmospheric or near atmospheric ionization source is comprised of an electrospray, atmospheric pressure chemical ionization, atmospheric laser desorption, photoionization, discharge ionization, glow discharge, or inductively coupled plasma ionization source.

17. Method for the transfer of charged particles, ions or combination thereof from a highly dispersive area or ion source at or near atmospheric pressure, focusing approximately all said charged particles or ions through a focusing region and into an inlet aperture for gas-phase ion analysis, the method comprising:

a. providing electric urging to said charged particles or ions with electric fields provided by a laminated lens comprised of alternating laminates of insulating and metal layers, an upstream electrode incorporated into metal laminate on topside of said lens, and a central electrode, and populated with a plurality of openings shaped into a toroidal passage or opening, said openings are on-axis and concentrically surrounding said central and upstream electrodes, said openings are contiguous with said laminates, said metal laminates and central electrode having ion drawing electric potentials, such that electric field lines between said ion source and said laminated lens are concentrated into said openings;

b. transmitting approximately all said charge particles or ions through said openings by means of electrostatic and electrodynamic potentials, or viscous forces from gases flowing upstream through said contiguous openings into said ion source region or flowing downstream through said contiguous openings towards said openings in the metal laminate on the underside of said lens, or a combination thereof; and c. providing electrostatic focusing to said charged particles or ions exiting said openings into said focusing region with a downstream electrode, said metal laminate on under side of lens, and a funnel lens or electrode focusing approximately all said charged particles or ions exiting said plurality of openings into a deep-well region; and viscous focusing to said charged particles or ions with a gas supplied in such a way to said lens that the flow of gas is on-axis with the motion of said charged particles or ions, said charged particles or ions directed towards said inlet aperture, whereby approximately all said ions flow into a small cross-sectional area or focal point at the entrance of said inlet aperture.

18. The method of claim 17, wherein said electrodynamic potentials of said central electrode are symmetrical, whereby said lens acts as a transmission filter, such as high-pass, low-pass, or band-pass filter, selecting the passage of ions of different mobilities.

19. The method of claim 17, wherein said inlet aperture is an atmospheric interface for a mass spectrometer, an ion mobility analyzer, or a combination thereof.

20. The method of claim 17, wherein said flow of on-axis gas flows into downstream focusing region through said openings in said lens, whereby providing axial forces directing ions away from said laminated lens and plurality of openings in said lens towards said inlet.

* * * * *